(12) United States Patent
Chauhan et al.

(10) Patent No.: US 12,493,771 B2
(45) Date of Patent: Dec. 9, 2025

(54) DEEP LEARNING MODEL FOR ENERGY FORECASTING

(71) Applicant: SAS Institute Inc., Cary, NC (US)

(72) Inventors: Richa Chauhan, Pune (IN); Harish Yadav, Maharashtra (IN); Hemil Shah, Maharashtra (IN); Kanchan Kamat, Wanowrie (IN); Arnulfo D. de Castro, Durham, NC (US); Tae Yoon Lee, Johns Creek, GA (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/410,742

(22) Filed: Jan. 11, 2024

(65) Prior Publication Data

US 2024/0370697 A1    Nov. 7, 2024

Related U.S. Application Data

(60) Provisional application No. 63/536,030, filed on Aug. 31, 2023.

(30) Foreign Application Priority Data

May 3, 2023    (IN) .............................. 202311031512

(51) Int. Cl.
    *G06N 3/045*    (2023.01)
    *G06N 20/20*    (2019.01)

(52) U.S. Cl.
    CPC ............. *G06N 3/045* (2023.01); *G06N 20/20* (2019.01)

(58) Field of Classification Search
    CPC .............................. G06N 3/045; G06N 20/20
    See application file for complete search history.

(56) References Cited

U.S. PATENT DOCUMENTS

| | | | |
|---|---|---|---|
| 11,132,990 B1 * | 9/2021 | Sun | G10L 25/21 |
| 11,675,042 B1 * | 6/2023 | Lloyd | G01S 3/7861 |
| | | | 136/246 |

(Continued)

OTHER PUBLICATIONS

Kjeldskov et al ("Eco-Forecasting for Domestic Electricity Use", 2015, CHI '15: Proceedings of the 33rd Annual ACM Conference on Human Factors in Computing Systems, pp. 1985-1988. (Year: 2015).*

(Continued)

*Primary Examiner* — Alexey Shmatov
*Assistant Examiner* — Clint Mullinax
(74) *Attorney, Agent, or Firm* — Kilpatrick Townsend & Stockton, LLP

(57) ABSTRACT

In one example, a system can receive an input from a user indicating a target variable to be forecasted over a future time window. The system can then determine independent variables that influence the target variable and generate a set of candidate variables, including combinations of the independent variables. The system can then execute a random forest classifier to identify a subset of candidate variables having a threshold level of influence on the target variable. The system can then construct a machine-learning model configured to receive the identified subset of candidate variables as inputs and generate a forecast of the target variable. After constructing the machine-learning model, the system can train the machine-learning model using historical data and then execute the machine-learning model to generate the forecast.

30 Claims, 21 Drawing Sheets

(56) References Cited

U.S. PATENT DOCUMENTS

2018/0033144 A1* 2/2018 Risman ............... G06T 7/0014
2023/0419106 A1* 12/2023 Mimaroglu ............ G06N 3/048

OTHER PUBLICATIONS

Kim et al ("Predicting residential energy consumption using CNN-LSTM neural networks", 2019, Energy 182, pp. 72-81. (Year: 2019).*

Xuan et al ("Multi-Model Fusion Short-Term Load Forecasting Based on Random Forest Feature Selection and Hybrid Neural Network", 2021, IEEE Access, vol. 9, pp. 69002-69009. (Year: 2021).*

Fahad Masood, et al. "A Hybrid CNN-LSTM Random Forest Model for Dysgraphia Classification from Hand-Written Characters with Uniform/Normal Distribution" Appl. Sci. 2023, 13,4275 https://doi.org/10.3390/app13074275.

Almas Begum, et al. "A Combined Deep CNN: LSTM with a Random Forest Approach for Breast Cancer Diagnosis" Hindawi Complexity, vol. 2022, Article ID 9299621, 9 pages Published Sep. 10, 2022 https://doi.org/10.1155/2022/9299621.

SAS Institute "Optimize decisions, unburden IT with energy forecasts as a service—Get repeatable, traceable and defensible load forecasts with reduced computing requirements" 2023, SAS Institute Inc.

SAS Institute "Forecasting accuracy brings 'newenergy' to Cameroon" https://www.sas.com/en_us/customers/eneo-fr-global.html Aug. 31, 2023.

SAS Institute "How Does Forecasting Enhance Smart Grid Benefits?" SAS white paper, 2016, SAS Institute Inc.

Jason Brownlee, PhD. "Time Series Prediction with LSTM Recurrent Neural Networks in Python with Keras" Jul. 21, 2016, Deep Learning for Time Series, MachineLearningMastery.com.

* cited by examiner

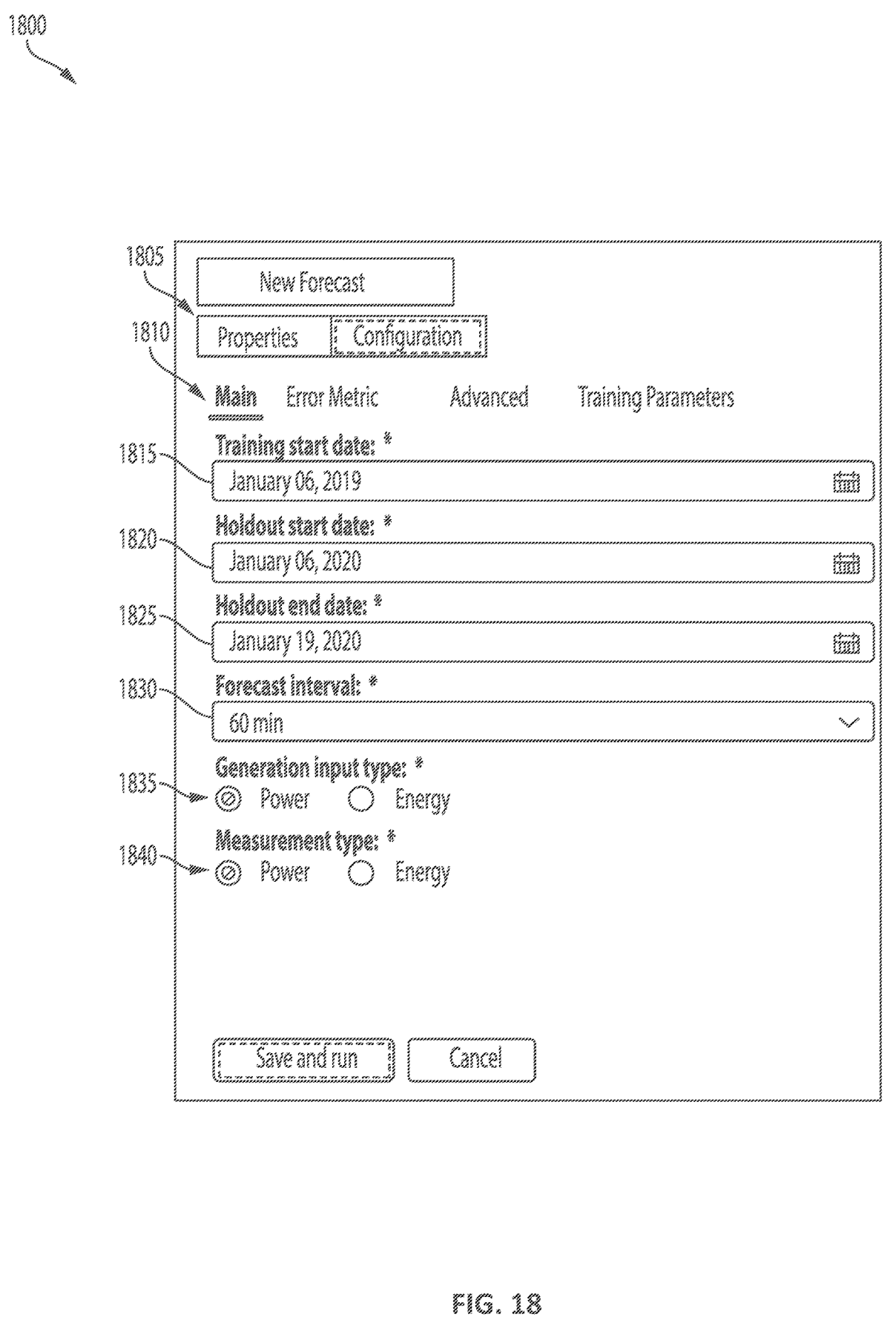

1800

1805 — New Forecast

1810 — Properties | Configuration

Main   Error Metric   Advanced   Training Parameters

1815 — Training start date: *
January 06, 2019

1820 — Holdout start date: *
January 06, 2020

1825 — Holdout end date: *
January 19, 2020

1830 — Forecast interval: *
60 min

1835 — Generation input type: *
◉ Power   ○ Energy

1840 — Measurement type: *
◉ Power   ○ Energy

Save and run | Cancel

FIG. 18

DEEP LEARNING MODEL FOR ENERGY FORECASTING

REFERENCE TO RELATED APPLICATIONS

The claims the benefit of priority under 35 U.S.C. 119(b) to Indian Provisional Patent Application No. 202311031512, filed May 3, 2023, and the benefit of priority under 35 U.S.C. § 119(e) to U.S. Provisional Patent Application No. 63/536,030, filed Aug. 31, 2023, the entirety of each of which is hereby incorporated by reference herein.

TECHNICAL FIELD

The present disclosure relates generally to machine learning on a computer. More specifically, but not by way of limitation, this disclosure relates to constructing and training a machine learning model to perform automated forecasting of a target variable, such as energy production or consumption.

BACKGROUND

Operations at electric utilities and other energy producers involve the management of generated electricity and other assets. Such operations typically include functions related to the production, transmission, and distribution of generated electricity. Operations may take place on a time scale ranging from milliseconds to years and can require decisions ranging from real-time load balancing and frequency adjustments to long-term infrastructure planning to accommodate future energy demand and integrate new technologies.

The supply and demand of electrical energy can be volatile, depending on myriad factors both predictable and not. Stable electrical generation and maintenance of ample reserves can require knowledge of elements such as grid constraints, generation capacities, fuel prices, and weather predictions. For instance, a prolonged heatwave can increase electricity demand due to higher air conditioning usage, influencing the operational configuration of generation and storage technology. In another example, a large industrial facility could unexpectedly shut down due to a technical fault, leading to an immediate drop in electricity consumption and an oversupply in the electrical grid.

SUMMARY

One example of the present disclosure includes a system comprising one or more processors and one or more memories including instructions that are executable by the one or more processors for causing the one or more processors to perform operations. The operations can include receiving an input from a user indicating a target variable to be forecasted over a future time window, wherein the target variable relates to energy consumption or energy production. The operations can include determining a plurality of independent variables that influence the target variable, in which the plurality of independent variables includes a plurality of temporal variables and a plurality of environmental variables. The operations can include generating a set of candidate variables that includes the plurality of independent variables and combinations of the plurality of temporal variables and the plurality of environmental variables. The operations can include executing a random forest classifier that is configured to identify, from the set of candidate variables, a subset of candidate variables having at least a threshold level of influence on the target variable, wherein the random forest classifier is configured to output the identified subset of candidate variables. The operations can include automatically constructing a machine-learning model that is configured to receive the identified subset of candidate variables as inputs and generate a forecast of the target variable as an output, the machine-learning model including a convolutional neural network (CNN) and a long-short term memory (LSTM) network. The operations can include, after constructing the machine-learning model, training the machine-learning model using historical data that indicates previous values of the target variable over a prior time window. The operations can include, after training the machine-learning model, executing the machine-learning model to generate the forecast indicating future values for the target variable over the future time window. The operations can include transmitting an output to the user indicating the forecast.

Another example of the present disclosure includes a method comprising operations. The operations can include receiving an input from a user indicating a target variable to be forecasted over a future time window, wherein the target variable relates to energy consumption or energy production. The operations can include determining a plurality of independent variables that influence the target variable, wherein the plurality of independent variables includes a plurality of temporal variables and a plurality of environmental variables. The operations can include generating a set of candidate variables that includes the plurality of independent variables and combinations of the plurality of temporal variables and the plurality of environmental variables. The operations can include executing a random forest classifier that is configured to identify, from the set of candidate variables, a subset of candidate variables having at least a threshold level of influence on the target variable, wherein the random forest classifier is configured to output the identified subset of candidate variables. The operations can include automatically constructing a machine-learning model that is configured to receive the identified subset of candidate variables as inputs and generate a forecast of the target variable as an output, the machine-learning model including a convolutional neural network (CNN) and a long-short term memory (LSTM) network. The operations can include, after constructing the machine-learning model, training the machine-learning model using historical data that indicates previous values of the target variable over a prior time window. The operations can include, after training the machine-learning model, executing the machine-learning model to generate the forecast indicating future values for the target variable over the future time window. The operations can include transmitting an output to the user indicating the forecast. Some or all of the operations can be performed by one or more processors.

Another example of the present disclosure includes a non-transitory computer-readable medium comprising program code that is executable by one or more processors for causing the one or more processors to perform operations. The operations can include receiving an input from a user indicating a target variable to be forecasted over a future time window, wherein the target variable relates to energy consumption or energy production. The operations can include determining a plurality of independent variables that influence the target variable, wherein the plurality of independent variables includes a plurality of temporal variables and a plurality of environmental variables. The operations can include generating a set of candidate variables that includes the plurality of independent variables and combinations of the plurality of temporal variables and the plurality of environmental variables. The operations can include executing a random forest classifier that is configured to identify, from the set of candidate variables, a subset of candidate variables having at least a threshold level of influence on the target variable, wherein the random forest classifier is configured to output the identified subset of candidate variables. The operations can include automatically constructing a machine-learning model that is configured to receive the identified subset of candidate variables as inputs and generate a forecast of the target variable as an output, the machine-learning model including a convolutional neural network (CNN) and a long-short term memory (LSTM) network. The operations can include, after constructing the machine-learning model, training the machine-learning model using historical data that indicates previous values of the target variable over a prior time window. The operations can include, after training the machine-learning model, executing the machine-learning model to generate the forecast indicating future values for the target variable over the future time window. The operations can include transmitting an output to the user indicating the forecast.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 18 depicts an example of a graphical user interface for allowing a user to specify a target variable to be forecasted and corresponding parameters, according to some aspects of the present disclosure.

Figure 1:
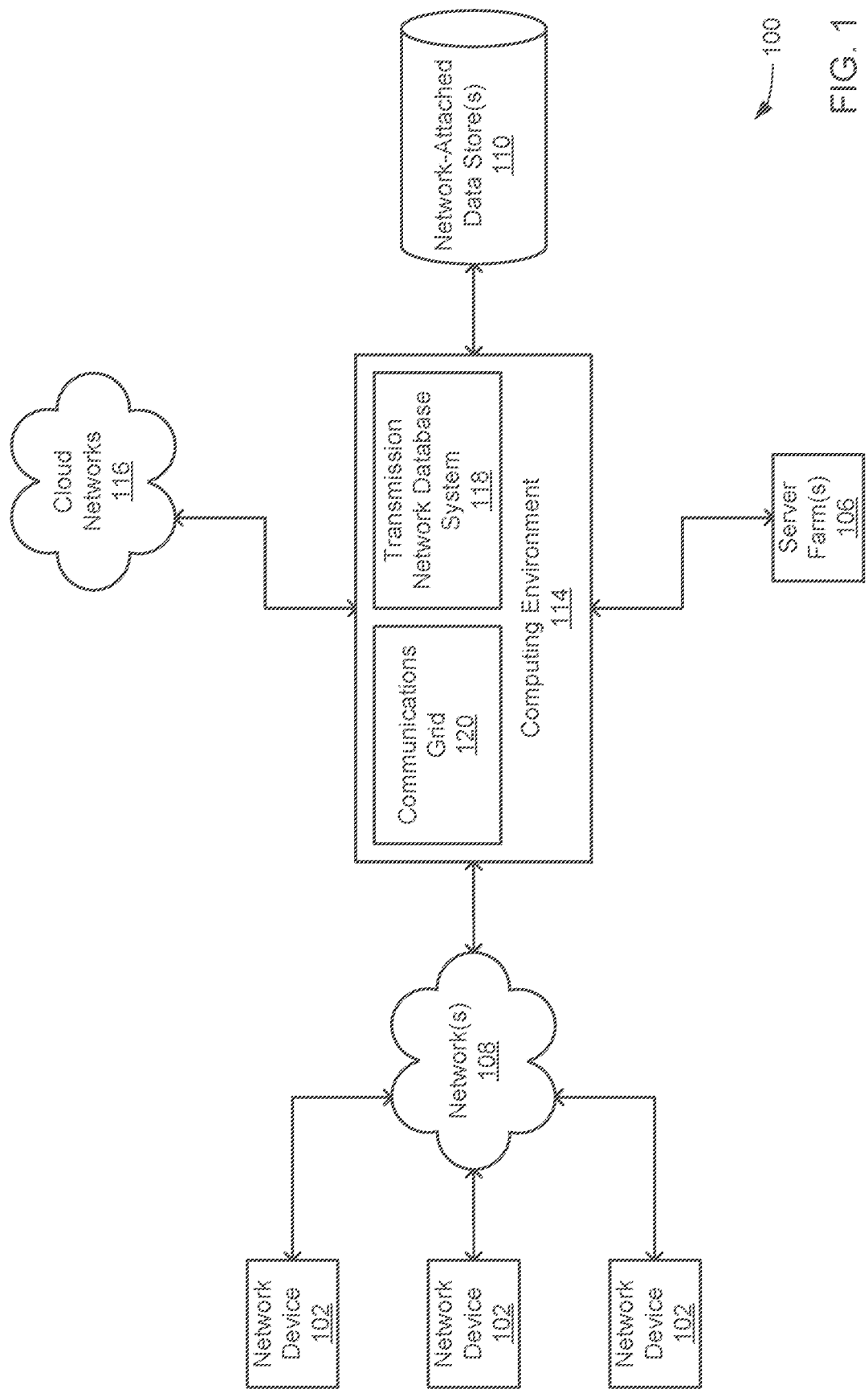
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Electric utilities and other energy producers must often make operational decisions within short periods of time, sometimes with limited input data and computational resources available. For example, some operational contexts may require many decisions within a few minutes or even shorter periods of time. Conversely, some operational contexts may require many decisions on a much longer time horizon, over periods up to years in length. In either case, such decisions require high levels of accuracy for optimized decision-making. Such decisions can be supplemented by computer-implemented forecasting techniques.

It can be challenging to build fast and accurate forecasting models. Existing approaches to producing forecasting models may involve treating all input variables the same during the training process. For example, forecasting models may be trained on training data that includes a large number of variables, where all of the variables are treated as having the same level of importance in the training data. It is normally the job of the forecasting model during the training process to identify the importance of the variables and weight them appropriately. While that may be a suitable approach in theory, in practice the forecasting model often makes mistakes in weighting variables. It is common for the trained forecasting model to place too much emphasis on a variable that is relatively unimportant for making a forecasting decision, or vice-versa, which can negatively impact its accuracy. Moreover, energy forecasting models may be specifically trained based on training data that is specific to certain regions and contexts, making the development of models that are broadly applicable in all contexts challenging. Existing forecasting models also tend to have architectures that fail to capture both spatial and temporal patterns in the data, negatively impacting their accuracy.

Some examples of the present disclosure can overcome one or more of the abovementioned problems by providing a novel process for automated model generation using a variety of variables and algorithms. In one example, upon specification of a target variable such as future energy demand, a system can use a random forest classifier to identify the most relevant variables from among a large, heterogeneous dataset to reduce the total number of possible independent variables to a smaller set of candidate variables. The candidate variables can then be used to construct a machine-learning model including components that capture both spatial and temporal patterns in the data. At the same time, the footprint of necessary training data is reduced, while the accuracy of the resultant model is improved.

More specifically, a forecasting model can be generated by a computer system that first receives an input indicating a target variable to be forecasted over a future time window. The target variable may relate to energy consumption or energy production, such as predicted energy demand or power output from a solar panel system at some future time. The computer system can then determine a number of independent variables that may influence the target variable. The independent variables may include a number of temporal or environmental variables, such as the month or the windspeed. The independent variables can be numerical variables or categorical variables. The computer system can then generate a set of candidate variables that includes the independent variables as well as combinations of the temporal and environmental variables. For instance, polynomial combinations of the temporal and environmental variables can be used.

Given the set of candidate variables, the computer system can execute a random forest classifier that is configured to identify a subset of candidate variables according to a predefined criteria. For instance, candidate variables that are determined to have a certain threshold level of influence on the target variable may be selected. In some examples, the random forest classifier may generate scores for the candidate variables indicating their level of influence on the target variable. The scores can then be used to identify the subset of candidate variables by comparing the scores to a threshold.

Next, the computer system can automatically construct an ML model that is configured to use the identified subset of candidate variables to generate a forecast of the target variable. The ML model may include, for example, a convolutional neural network (CNN) or a long-short term memory (LSTM) network. After constructing the ML model, the computer system can train the ML model using historical data. For instance, the historical data may include previous values of the target variable. Then, after training the ML model, the computer system can execute the ML model to generate the forecast indicating future values for the target variable over the future time window and transmit the forecast to a user using a suitable output device such as a display connected to the computer system. In some examples, an accuracy metric can be calculated for the trained ML model using a set of validation data and compared with accuracy metrics determined using other forecasting models before designating the ML for use in generating the forecast.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
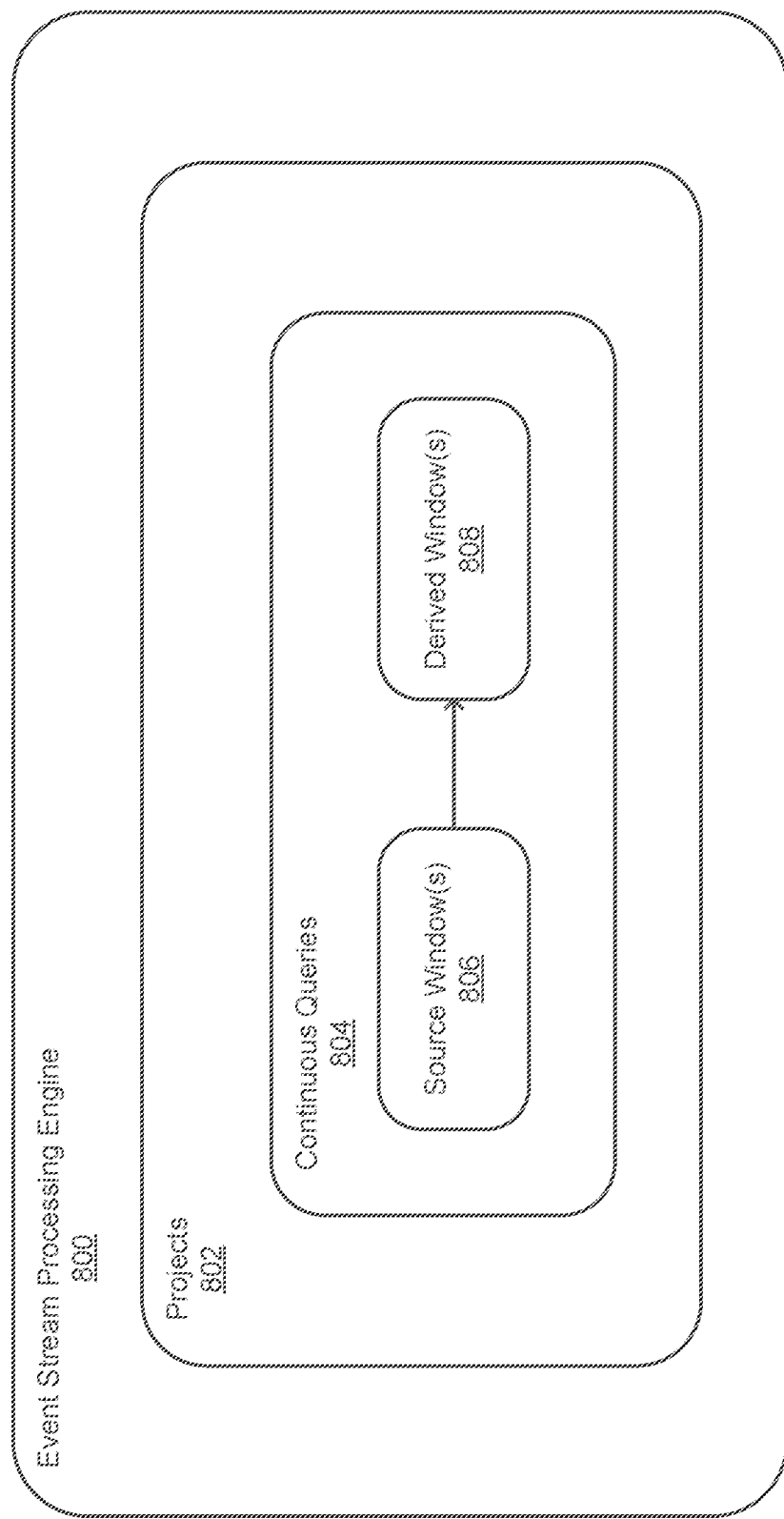
FIG. 8 shows a block diagram including components of an Event Stream Processing Engine (ESPE) according to some aspects of the present disclosure.
Figure 9:
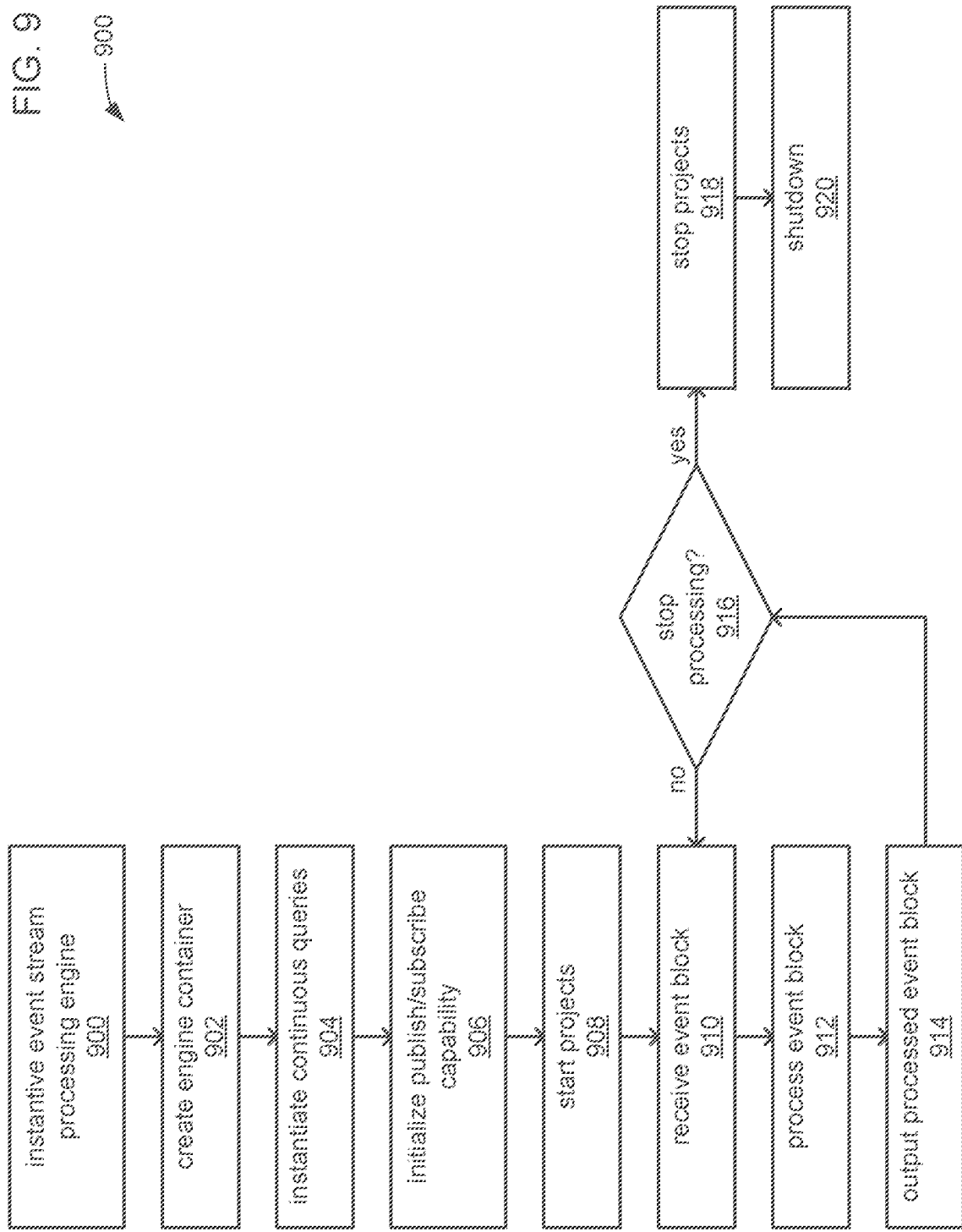
FIG. 9 shows a flow chart of an example process including operations performed by an event stream processing engine according to some aspects of the present disclosure.
Figure 10:
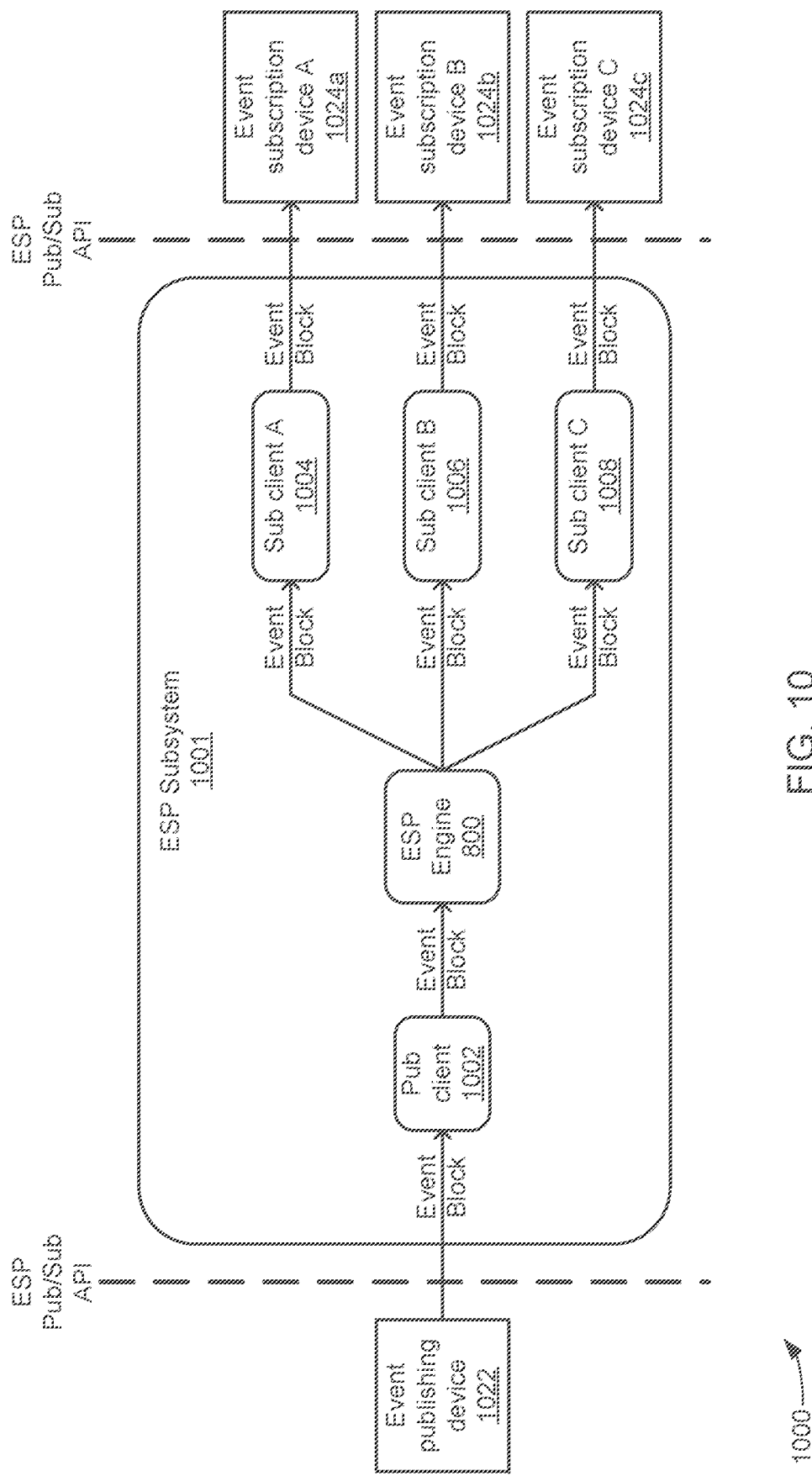
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
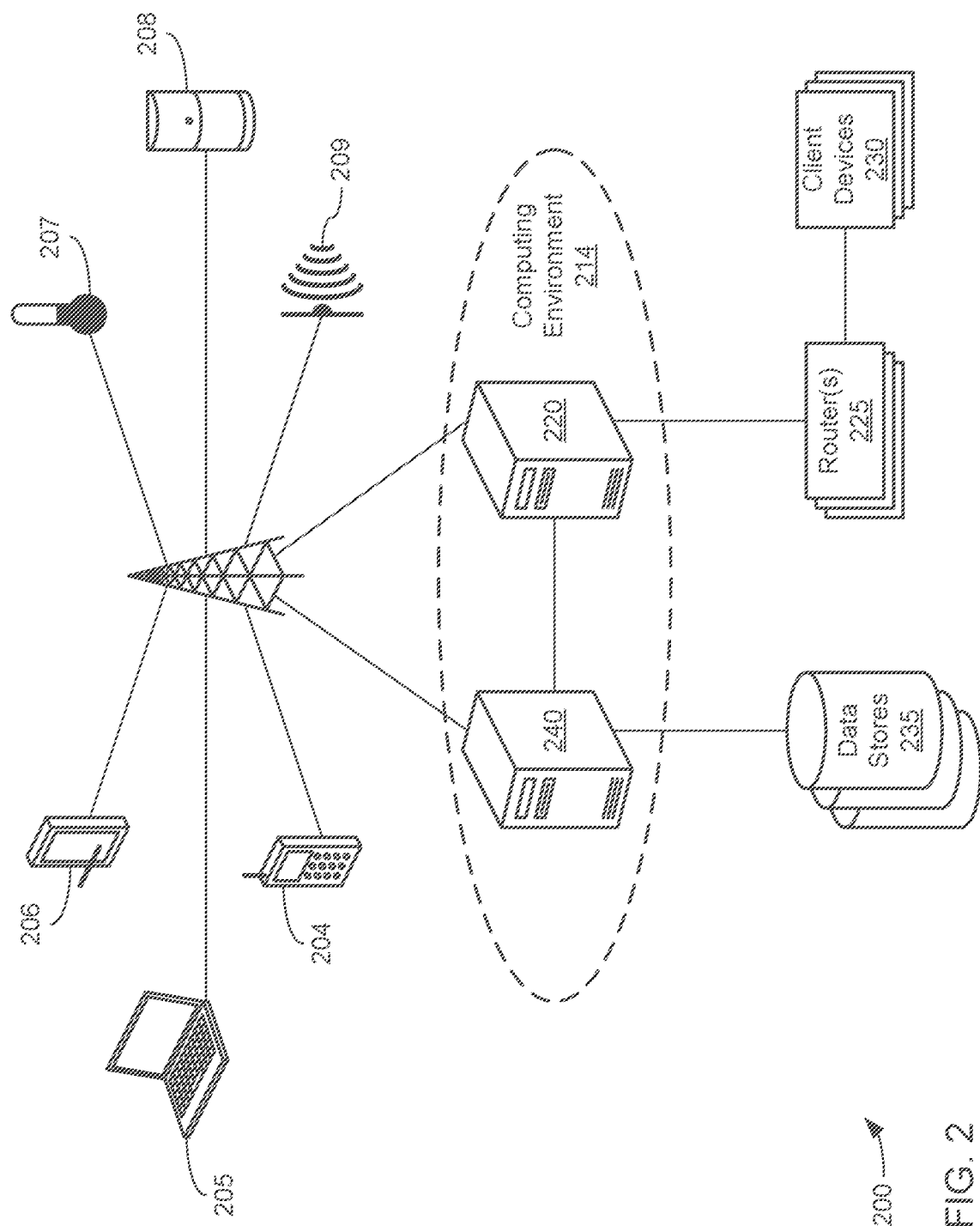
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computer systems (e.g., a home computer, a laptop computer, a tablet, a personal digital assistant (PDA), a computer system, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
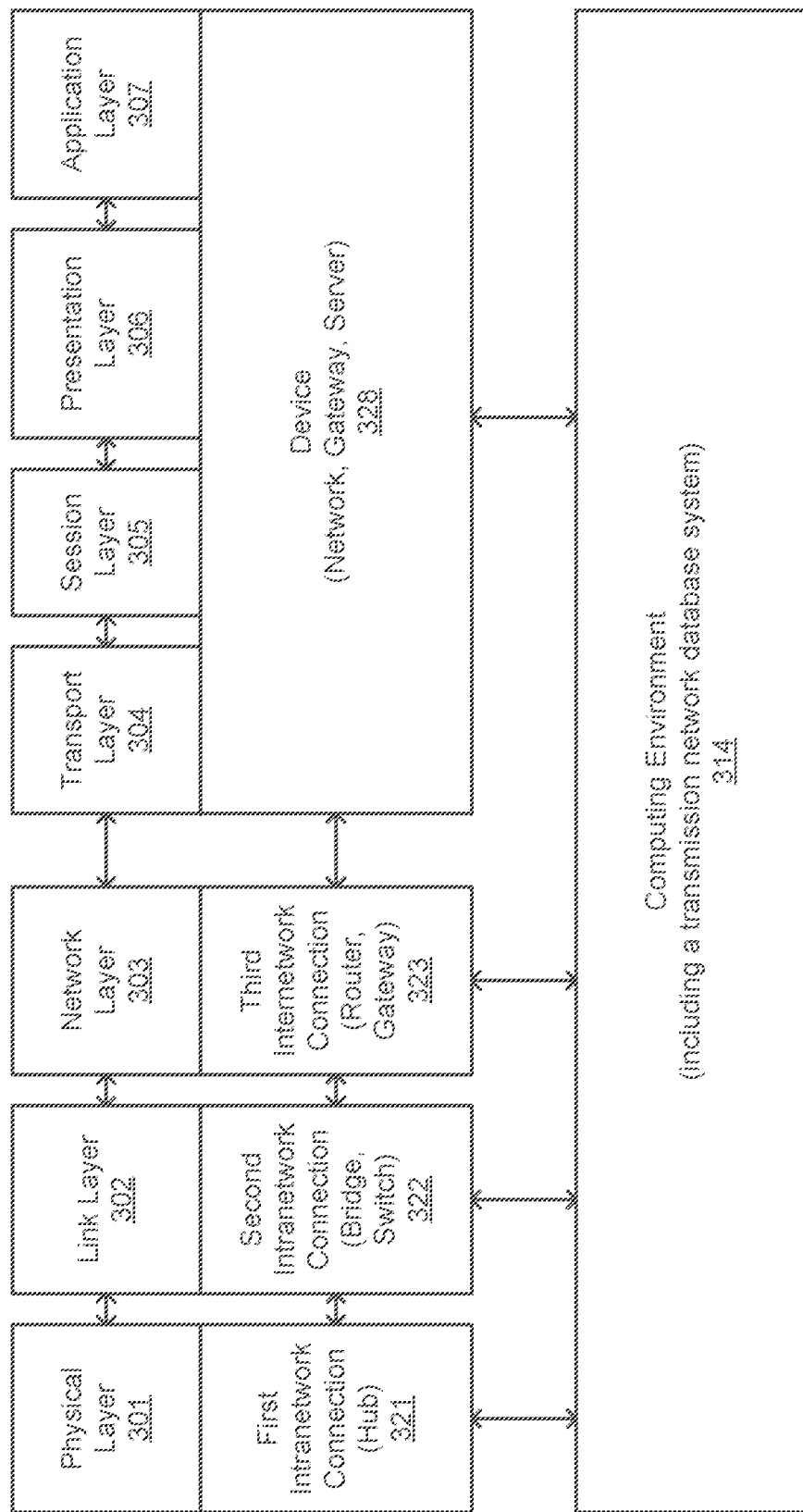
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
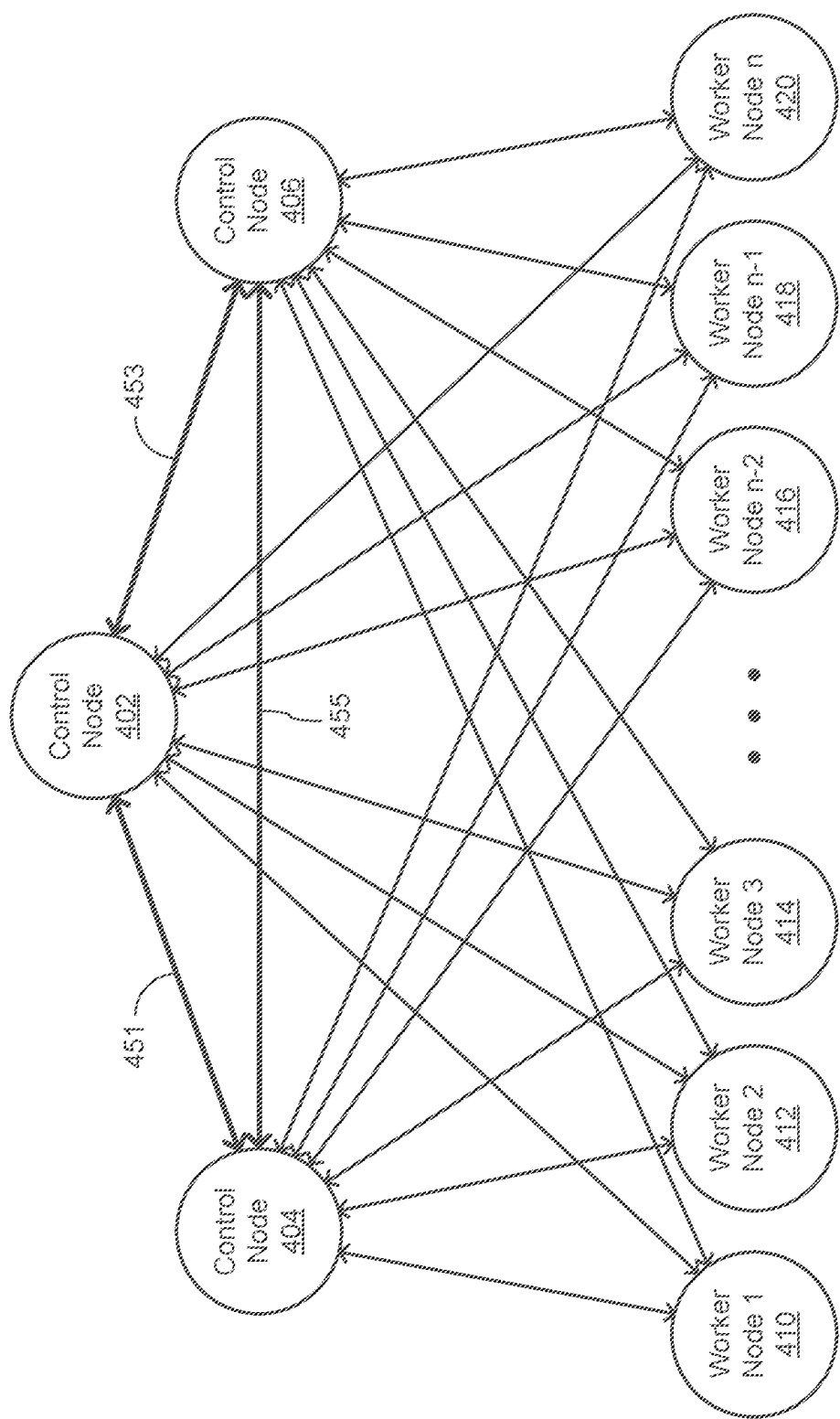
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID).

This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
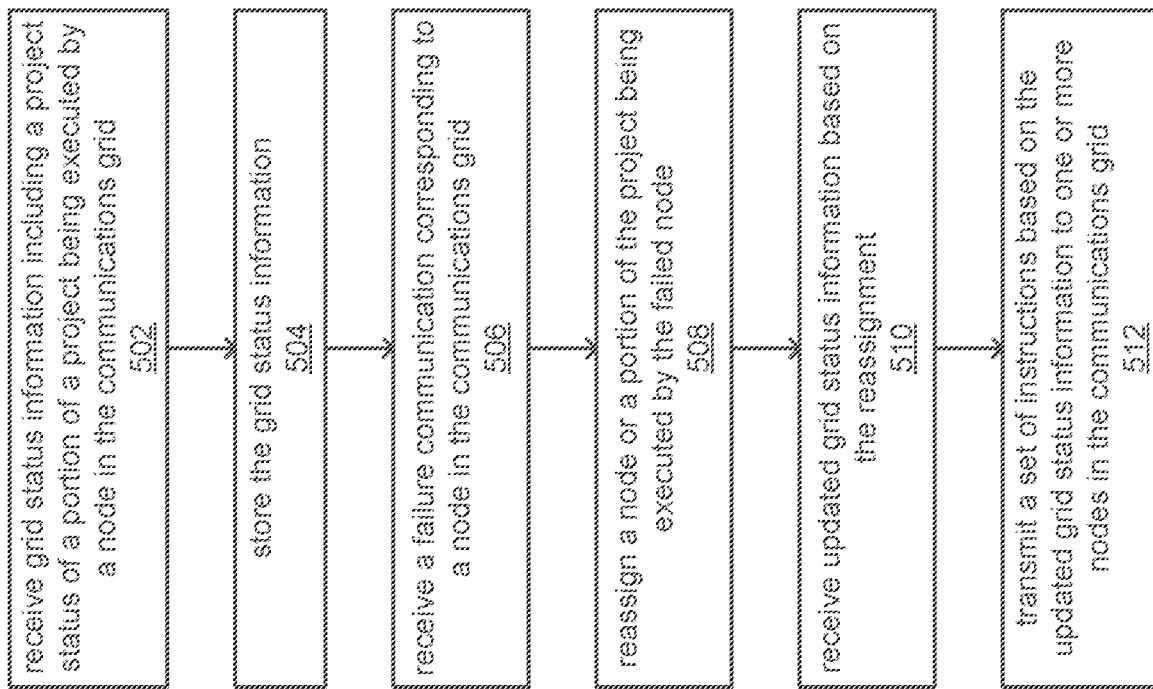
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
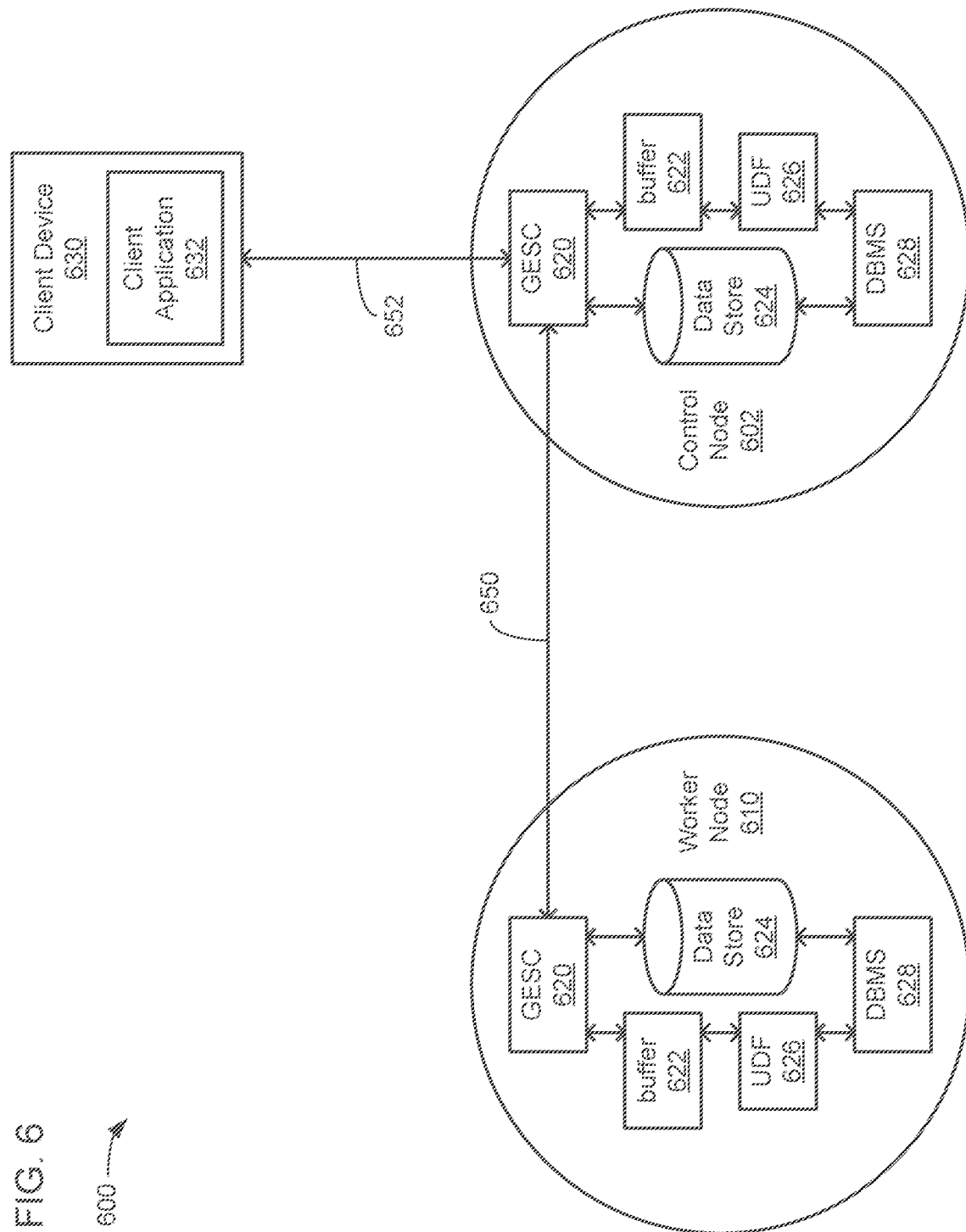
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
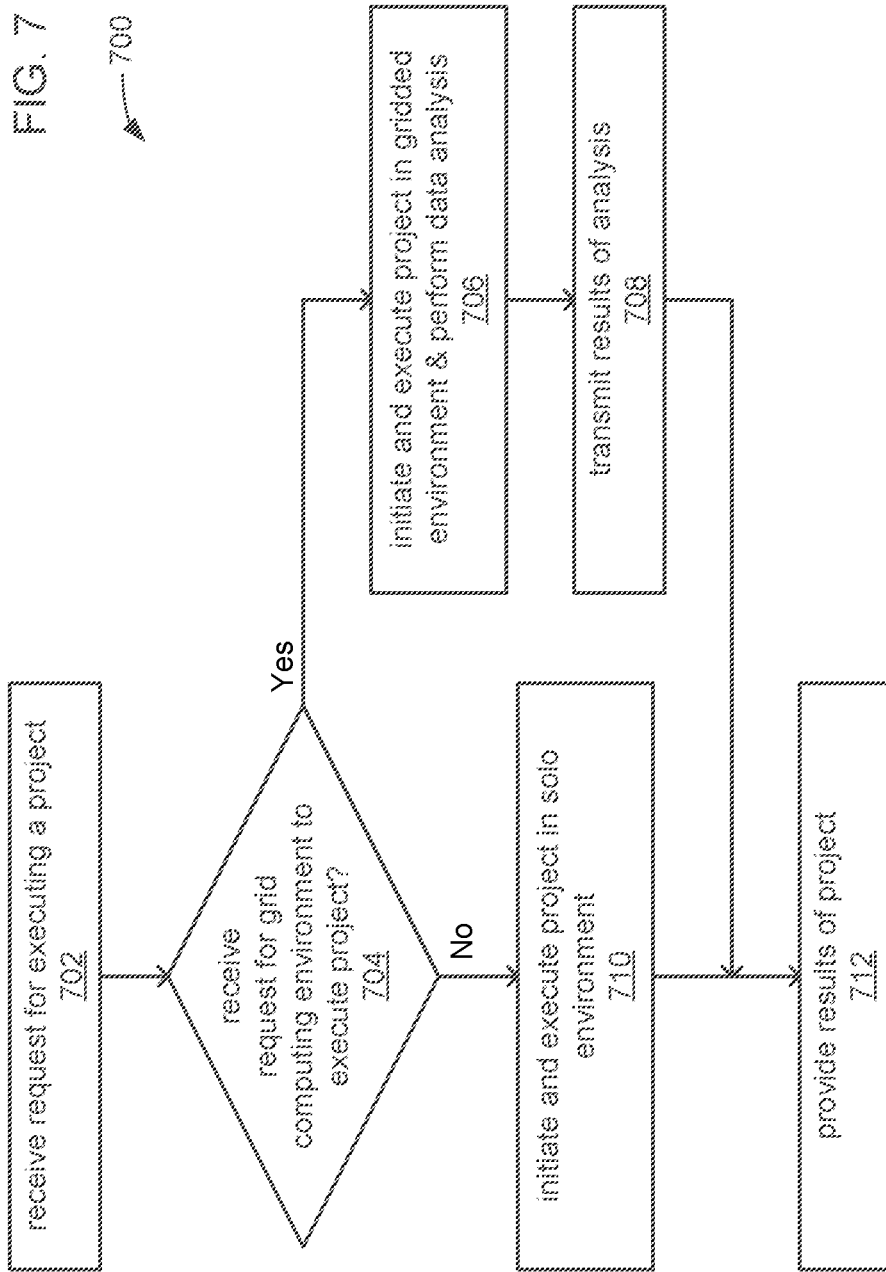
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computer system of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computer systems of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computer system. The computer system includes, but is not limited to, a processor and a computer-readable medium operably coupled to the processor. The processor is configured to execute an ESP engine (ESPE). The computer-readable medium has instructions stored thereon that, when executed by the processor, cause the computer system to support the failover. An event block object is received from the ESPE that includes a unique identifier. A first status of the computer system as active or standby is determined. When the first status is active, a second status of the computer system as newly active or not newly active is determined. Newly active is determined when the computer system is switched from a standby status to an active status. When the second status is newly active, a last published event block object identifier that uniquely identifies a last published event block object is determined. A next event block object is selected from a non-transitory computer-readable medium accessible by the computer system. The next event block object has an event block object identifier that is greater than the determined last published event block object identifier. The selected next event block object is published to an out-messaging network device. When the second status of the computer system is not newly active, the received event block object is published to the out-messaging network device. When the first status of the computer system is standby, the received event block object is stored in the non-transitory computer-readable medium.

Figure 11:
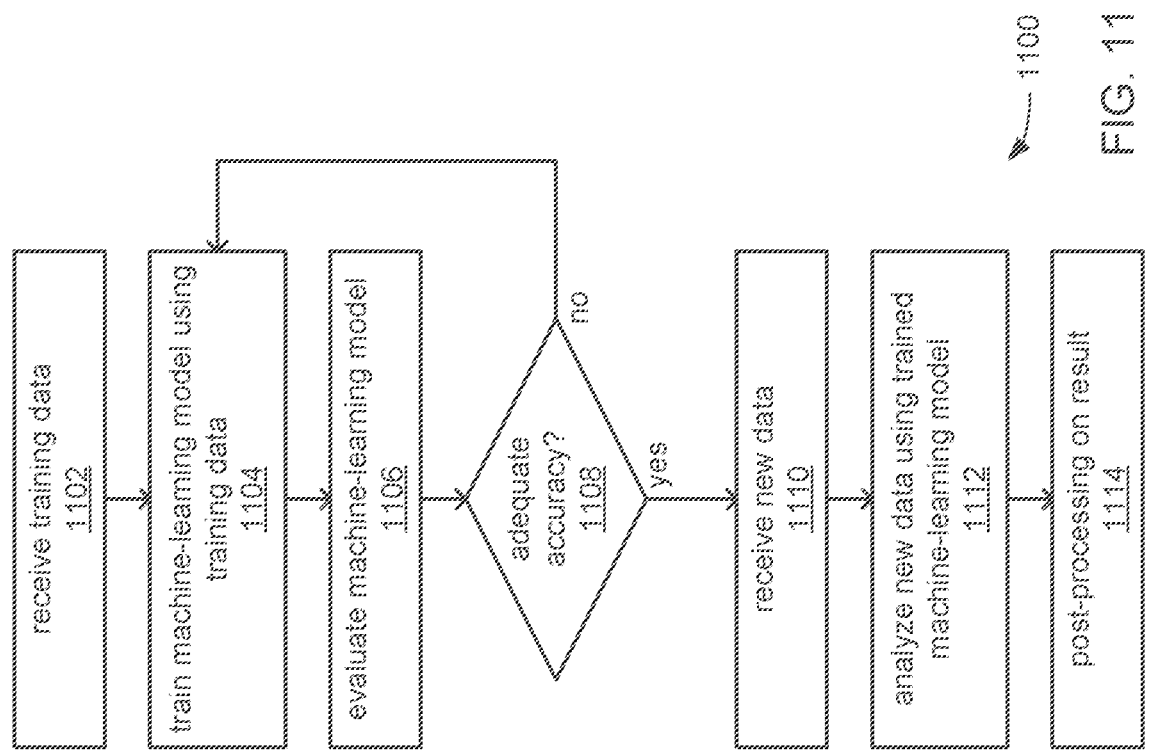
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
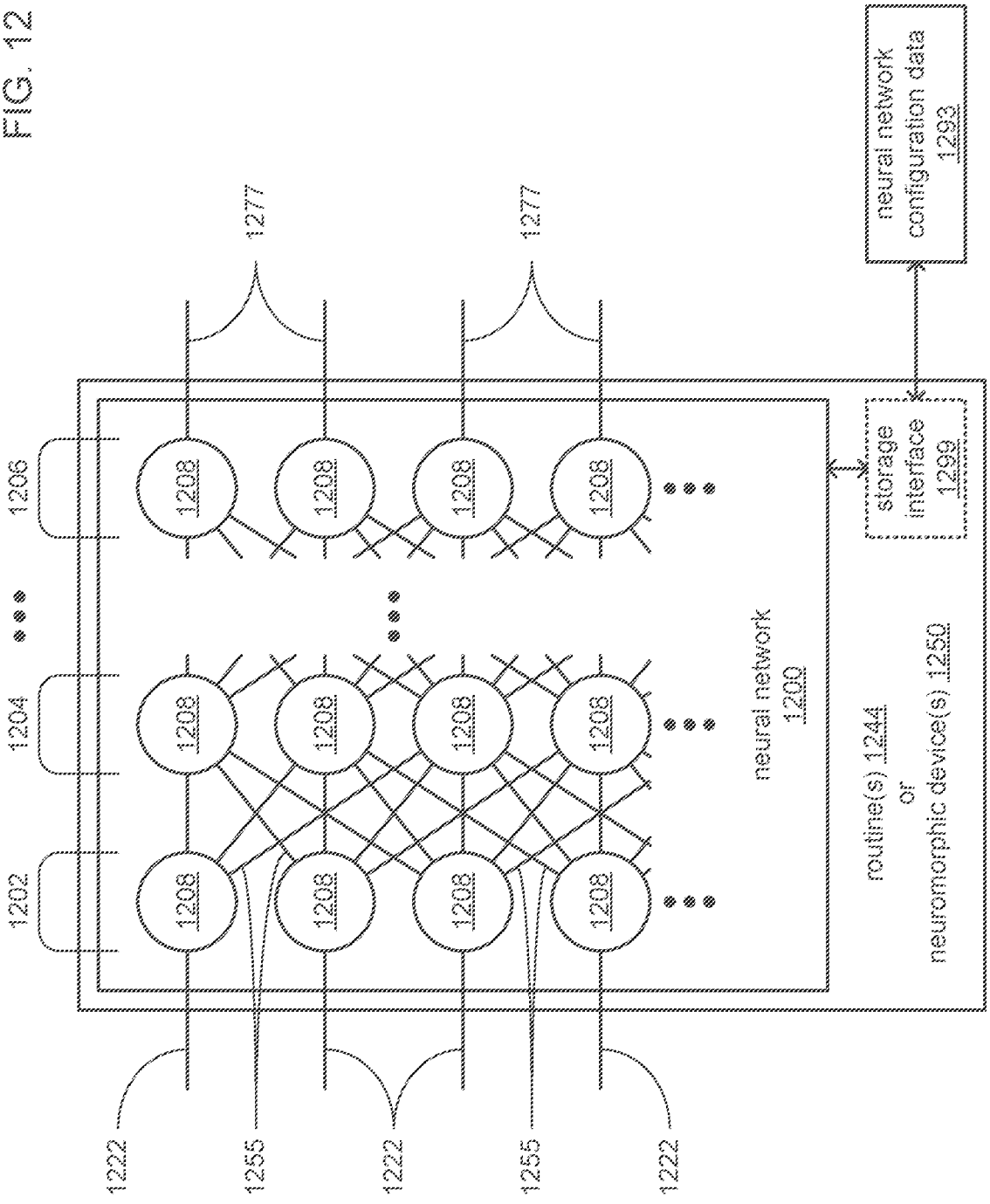
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computer system or multiple computer systems, such as the communications grid computing system 400 discussed above.

Implementing some examples of the present disclosure at least in part by using machine-learning models can reduce the total number of processing iterations, time, memory, electrical power, or any combination of these consumed by a computer system when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
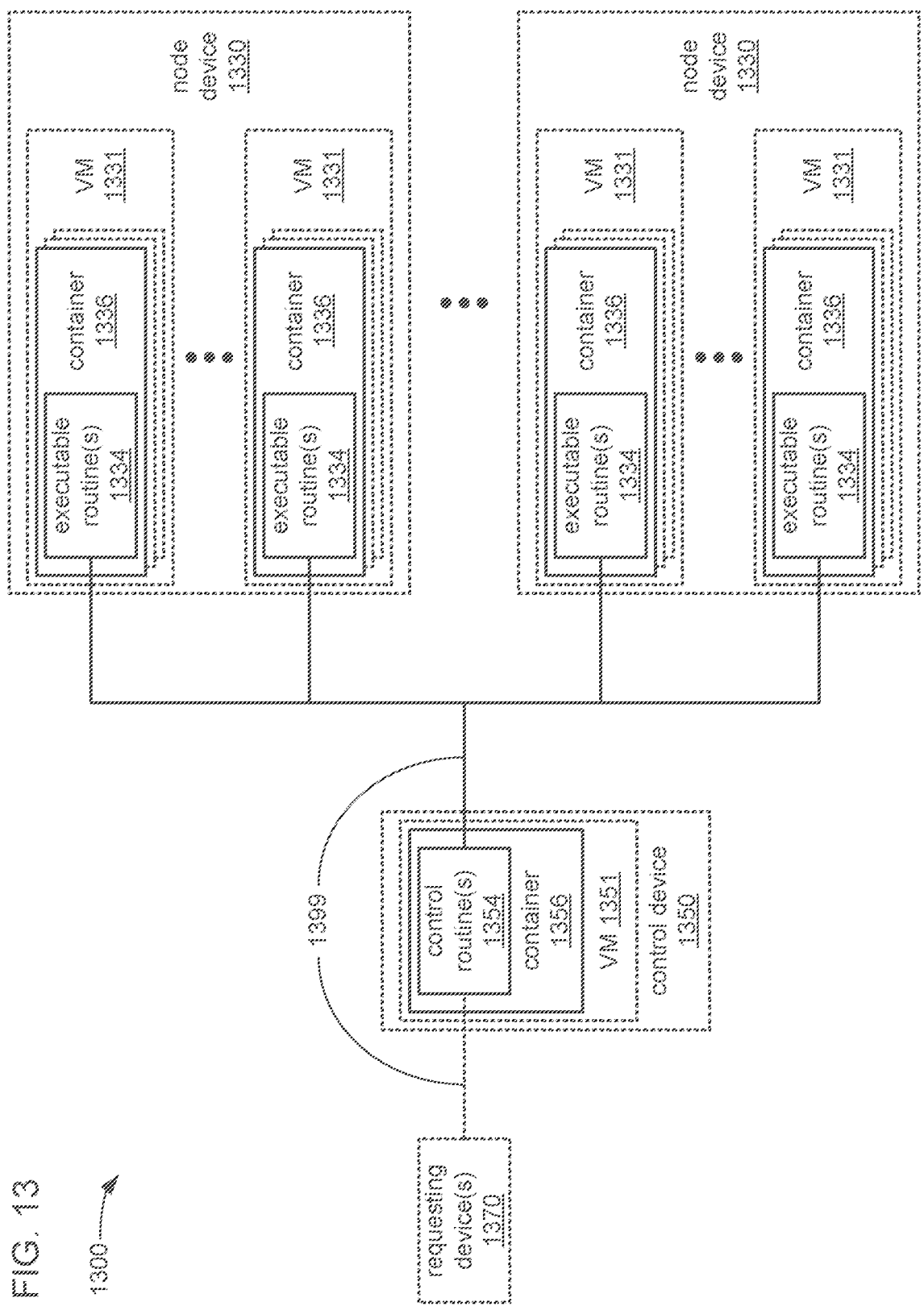
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
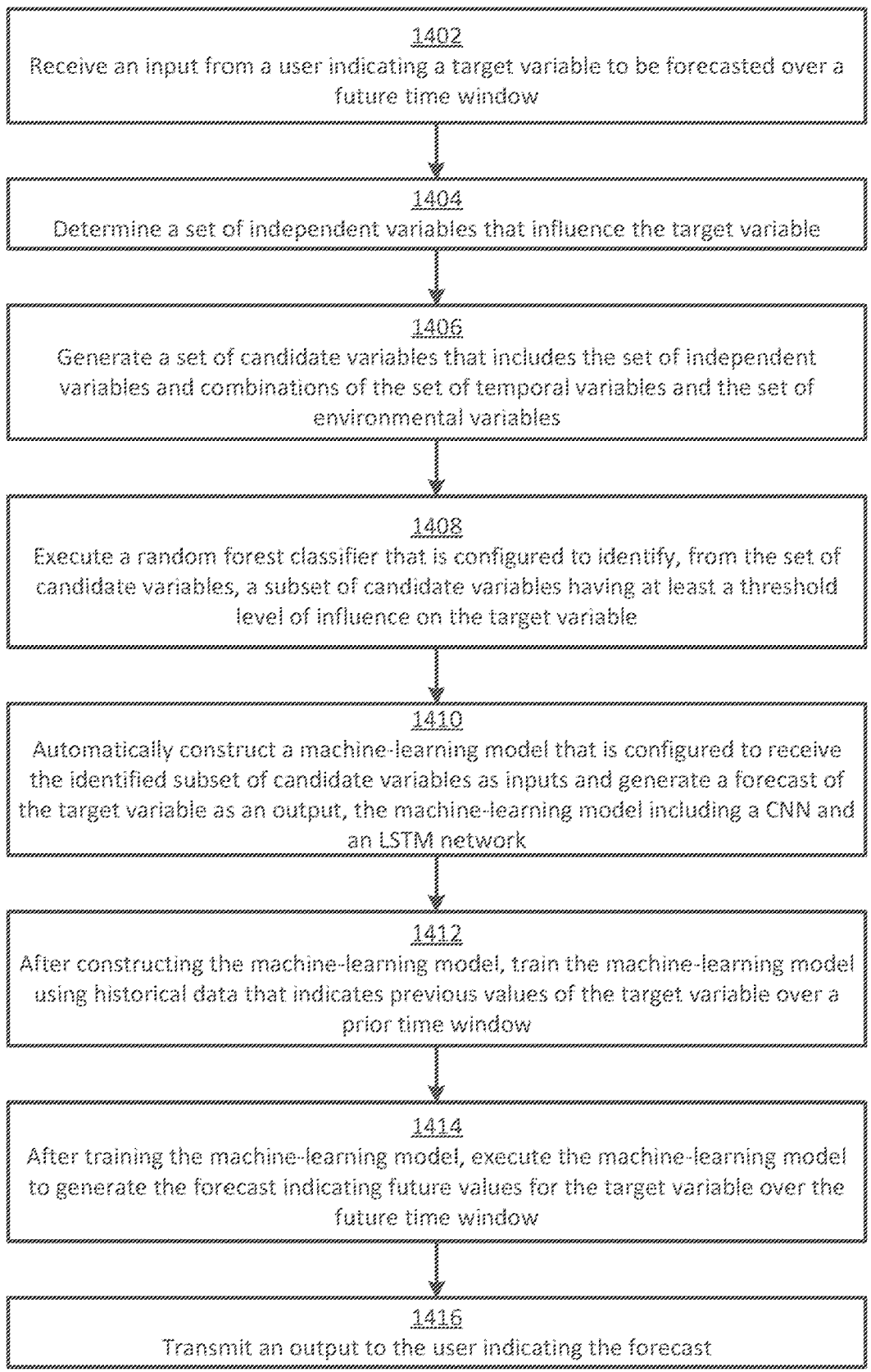
FIG. 14 shows a flowchart of an example of a process for constructing and training a model for forecasting a target variable (e.g., energy consumption or energy production) over a future time window, according to some aspects of the present disclosure.

FIG. 14 shows a flowchart of an example of a process for constructing and training a model for forecasting a target variable (e.g., energy consumption or energy production) over a future time window. Other examples may involve more operations, fewer operations, different operations, or a different order of operations than is shown in FIG. 14.

In block 1402, a computer system receives an input from a user indicating a target variable to be forecasted over a future time window. In some examples, the target variable relates to energy consumption or energy production. In other examples, the target variable can relate to anything else to be forecasted over a future timespan. For instance, target variables from a diverse range of contexts can be forecasted, such as deforestation rates in ecological systems, network latency in computer networks, average temperature increase in climate systems, traffic flow in urban infrastructures, fish population levels in marine ecosystems, air quality index in environmental monitoring, public transportation ridership in city planning, frequency of cyber attacks in security networks, among many others.

For example, the input may be received by way of a suitable graphical user interface (GUI). The user may select, via the GUI, the target variable from among a group of options in the GUI or otherwise input a selection of the target variable. The target variable can be, for instance, a prediction of future power demand or solar power generation or output. In addition to the target variable, the input may include other parameters such as start and end dates that define training datasets and validation datasets. The input may further include error metrics, model parameters, additional modeling variables, relevant files containing training data, and so on.

In block 1404, the computer system determines a set of independent variables that influence the target variable, in which the set of independent variables includes one or more temporal variables and one or more environmental variables. Temporal variables include variables that correspond to changes over time such as date, time, days of the week, or other similar measurements of time. Environmental variables include variables that represent the context in which a system of interest operates, often coupled with a temporal variable or index. Examples of environmental variables include irradiance, azimuth angle of the sun, air quality index, windspeed, and so on.

For example, an extract-transform-load (ETL) procedure can be used to load an input dataset into a suitable memory device, such as a database. For instance, in an example where the target variable is the power output from a solar panel system, the independent variables may include month, day, hour, and irradiance. The independent variables may be received by way of input data from one or more files, databases, cloud storage locations, etc. In some examples, the ETL procedure may include the capability to identify a particular subset of the input data as independent variables using, for instance, a suitable GUI. In some other examples, independent variables may be automatically identified from the input data according to a predefined set of criteria. For instance, input data that is identified as time series data can be automatically designated as an independent variable.

The independent variables may include both numerical variables and categorical variables. Numerical variables include variables that have quantifiable values and can be measured. Numerical values can be either continuous or discrete. Examples of numerical temporal variables include lags, month, weekday, date, datetime, or hour. Examples of numerical environmental variables include lags, windspeed, azimuth angle of the sun, air quality, temperature, humidity, pressure, or irradiance.

Categorical variables include variables typically representing types or categories that can take one value out of a limited set of values, such as compass directions or colors. Categorical variables are sometimes known as class variables. Examples of categorical temporal variables include month or day of the week. Examples of categorical environmental variables include geography types, land use, air quality index, or cloud cover.

In block 1406, the computer system generates a set of candidate variables that includes the set of independent variables. The set of candidate variables may also include various combinations of the set of temporal variables, various combinations the set of environmental variables, and/or various combinations of the set of temporal variables and the set of environmental variables. For example, the independent variables determined in block 1404 can be used to populate an analytical base table (ABT). The ABT is a data structure that relates the target variable to the candidate variables. The candidate variables may include the some or all of the independent variables, as well as combinations thereof.

For example, the candidate variables may include polynomial combinations of the independent variables, including polynomial multiples of the temporal variables and polynomial multiples of the environmental variables and combinations of the two. Such combinations of independent variables may be referred to as interaction variables. For instance, combinations of the independent variables may include combinations such as month•hour, month•irradiance, or month•hour•irradiance.

The ABT may include all of the candidate variables in a format suitable for processing by machine-learning (ML) models. The ABT may include the independent variables, various combinations thereof, as well as other elements from the input data. In some examples, prior to or during the population of the ABT, data hygiene steps can be taken to prepare the input data for processing. Examples of such procedures are described below with respect to FIG. 16.

In block 1408, the computer system executes a random forest classifier that is configured to identify, from the set of candidate variables, a subset of candidate variables having at least a threshold level of influence on the target variable. The random forest classifier is further configured to output the identified subset of candidate variables.

For example, the ABT generated in block 1406, including the candidate variables, may be provided as input to the random forest classifier. The random forest classifier may be a pre-trained model including a number of decision trees. The random forest classifier can be used to identify the most important candidate variables from among the set of candidate variables to include in the final model based on their contribution to the model's predictive power. In some examples, the computer system may include facilities to manually identify certain independent variables as candidate variables as when, for instance, modeling the impact of a key independent variable is desired, regardless of its estimated importance.

In block 1410, the computer system automatically constructs a machine-learning (ML) model that is configured to receive the identified subset of candidate variables as inputs and generate a forecast of the target variable as an output. The ML model may include any number of and combination of ML model components. The ML model may thus be a combination or ensemble ML model that includes two or more ML models working separately or in concert. Some example combination ML models may have an integrated architecture in which the output of one ML model directly feeds into another ML model. Examples of ensemble ML models include stacked configurations in which different models' predictions are used as inputs to a subsequent model. Another example includes gradient boosting machines, which build models sequentially, each model trained to improve on the errors of the previous model.

For instance, the ML model can include a convolutional neural network (CNN) and a long-short term memory (LSTM) network. The combination of CNN and LSTM networks can provide a deep learning architecture that is suitable for time series forecasting with numerous independent variables as may be found in, for instance, solar generation forecasting. The combination of CNN and LSTM networks can capture both the spatial and temporal dependencies in the input data.

For instance, the CNN component can extract spatial features from the input data, such as the spatial distribution of energy generation across various locations, while the LSTM component captures the temporal patterns and dependencies in the data, such as daily and seasonal fluctuations in energy production data. The combination of CNN and LSTM networks can receive the subset of candidate variables identified in block 1410 to make predictions about future generation values.

In some examples, parameters (e.g., hyperparameters) of the constructed ML model can be specified or adjusted using suitable user interface controls. The example graphical user interface in FIG. 19, described in greater detail later on, depicts an example of a suite of controls for manipulating the parameters of the constructed ML model.

In block 1412, the computer system, after constructing the machine-learning model, trains the ML model using historical data that indicates previous values of the target variable over a prior time window. For example, numerical analysis software can be used to train the ML model. In some examples, cloud-based numerical analysis software may be used, including predefined actions or operations that are carried out by a distributed, in-memory cloud engine to perform analytics and data manipulation tasks. Such actions or operations can be used to construct ML models, adjust ML model parameters and components, and to train ML models once constructed. Example operations include predefined actions for building models, adding or subtracting neural network layers, or training deep-learning ML models.

Training ML models in the context of cloud-based numerical analysis software may include ML model evaluation such as empirical testing of various combinations of neural network compositions including the number of layers and parameters for each layer, the number of filters, filter size, number of LSTM units, number of nodes or neurons, and so on. Some examples may be pre-configured with default parameters or ML model compositions. The default parameters in these examples may be chosen based on empirical observations or testing that result in optimized or minimized hourly Mean Absolute Error (MAE) or Mean Absolute Percentage Error (MAPE), as well as other key performance indicators (KPIs).

During training, a variety of ML model configurations may be constructed and tested. In some examples, a "champion model" may be selected from among the various ML models tested during training. Champion model selection may refer to the process of choosing the best predictive model from among a set of candidate models based on their performance on a given dataset. The champion model is the ML model that outperforms others according to certain predefined criteria, such as accuracy, precision, recall, or a combination of various metrics. The champion model can be manually selected by the user or, in some examples, selected automatically according to a predefined set of criteria or algorithms.

In block 1414, the computer system, after training the ML model, executes the ML model to generate the forecast indicating future values for the target variable over the future time window. For example, the ML model constructed and trained in blocks 1410 and 1412, respectively, can be used to generate, for short-term or very-short-term forecasts for the future period using the trained ML model. An example of short-term forecast may be a forecast of energy demand for a 1-week future period and an approximately 1-hour resolution. An example of a very-short-term forecast may be a forecast of power generation with a 1-day future period and an approximately 1-minute resolution.

In some examples, the trained ML model may be used to generate forecasts using historical data sets for evaluation. During the evaluation process, both numerical and graphical forecasts may be generated to compare the forecasted result against known historical energy production data and to analyze error statistics. For instance, the ML model can generate forecasts for a holdout period or segment of data not used during the training of the model reserved for testing its performance. These and other procedures can confirm the effectiveness of the model in accurately predicting energy production across different locations and datasets.

Figure 20:
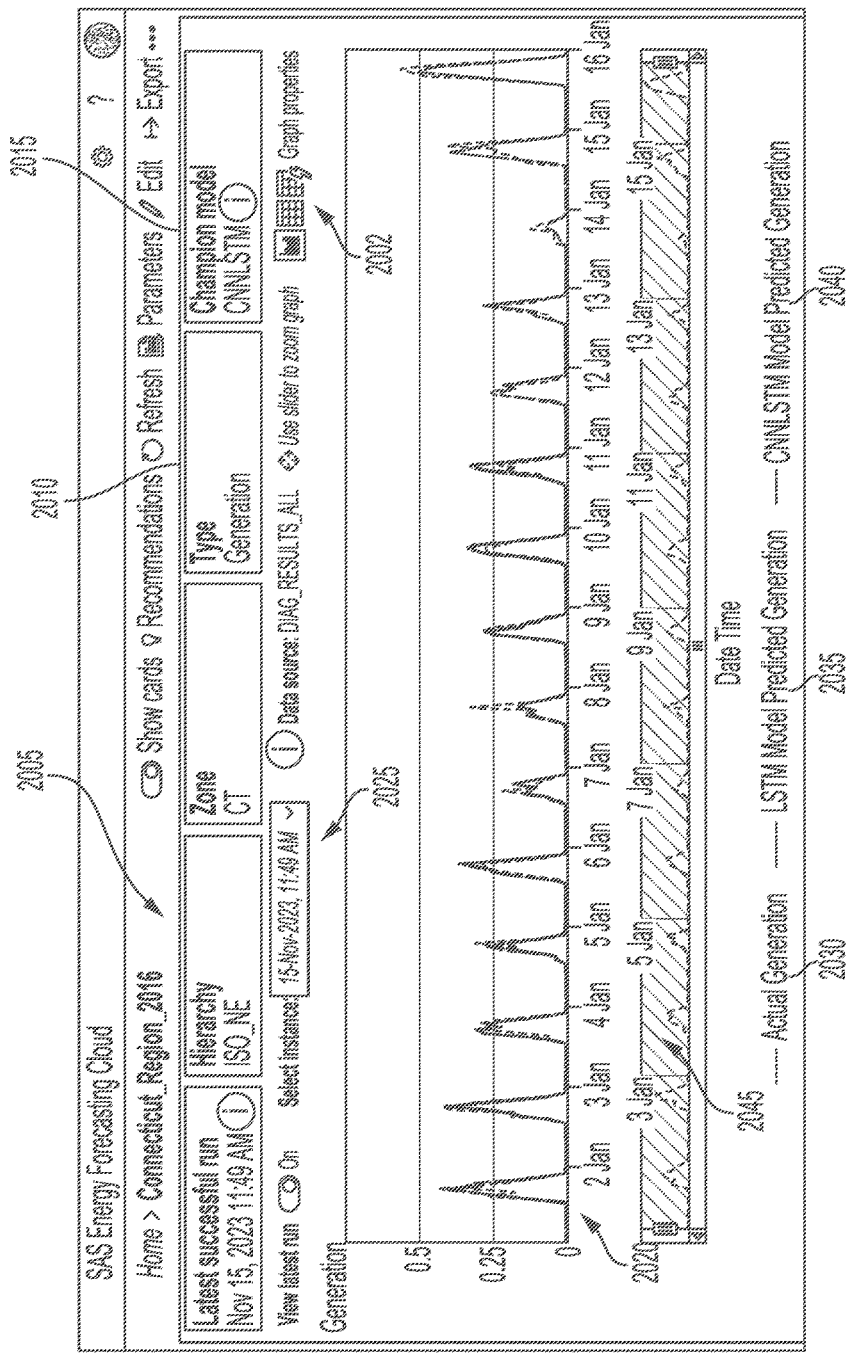
FIG. 20 depicts an example of a graphical forecast as may be generated for a target variable, according to some aspects of the present disclosure.
Figure 21:
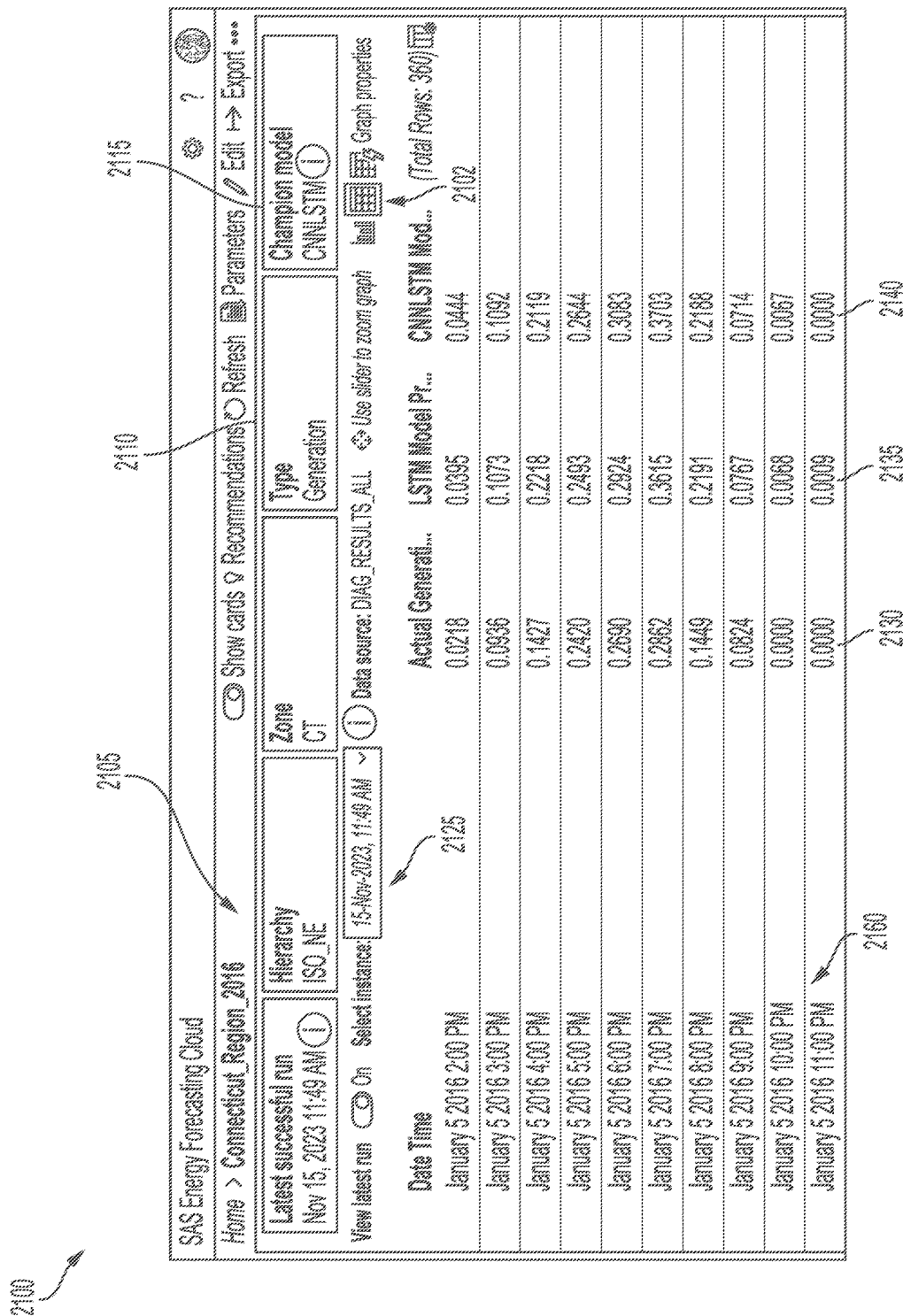
FIG. 21 depicts an example of a tabular forecast as may be generated for a target variable, according to some aspects of the present disclosure.

In block 1416, the computer system transmits an output to the user indicating the forecast. For example, the trained and evaluated ML model can be used to generate forecasts for the target variable using input data not used during training. The generated forecasts can then be output to the user, for example by transmitting the forecasts over a network (e.g., the Internet) to a user device of the user, or by outputting the forecasts on a display to the user. The generated forecasts may be provided to the user in any suitable format including numerical, tabulated, or graphical presentations. Such forecasts may be utilized by users such as power grid operators, utility companies, and energy traders to make informed decisions about energy production and consumption. The informed decisions can contribute to the development of more sustainable energy systems. Examples of generated forecasts are depicted in FIGS. 20 and 21.

In one example of the process described in FIG. 14, the target variable is the power output from a solar panel system. The independent variables are ones that influence the target variable, such as cloud cover and irradiance (e.g., power from the sun received on a given surface area at a given time). These independent variables, and combinations thereof, constitute the candidate variables. The random forest classifier is configured to identify a subset of candidate variables having at least a threshold level of influence on the power output from the solar panel system. Identifying the subset of candidate variables can reduce the total number of independent variables used to construct a ML model as well as the scope of input to the trained ML model, thereby reducing its size and improving its speed and accuracy. Using historical data that indicates prior power output from the solar panel system over a prior time window, the ML model is configured and trained to generate a solar power forecast that predicts future power output from the solar panel system over a future time window. The forecast is output to the user including the solar power forecast.

Figure 15:
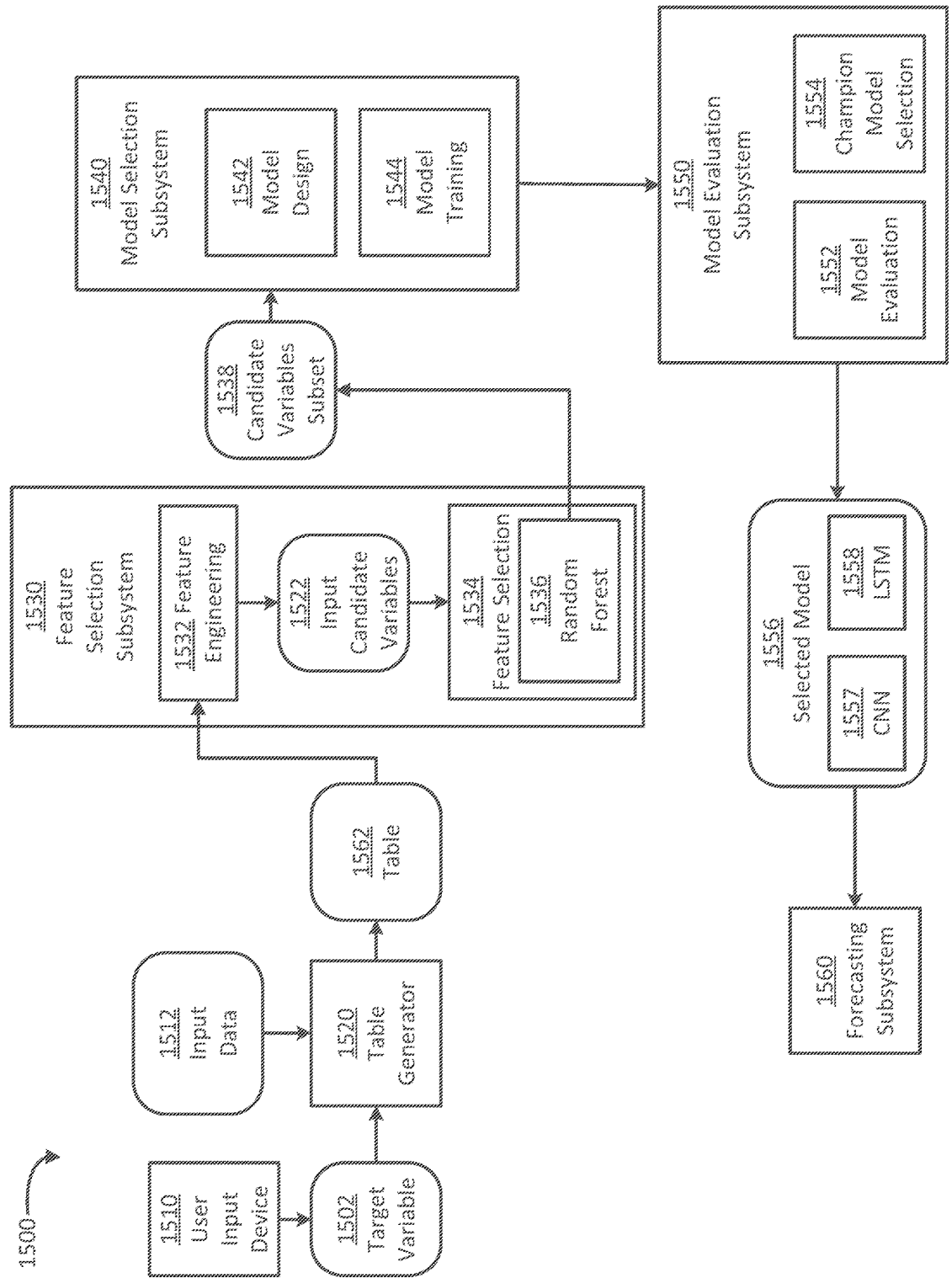
FIG. 15 shows an example of a system that can be used for constructing and training deep learning models for forecasting target variables, according to some aspects of the present disclosure.

Turning now to FIG. 15, FIG. 15 shows an example of a system 1500 that can be used for constructing and training deep learning models for forecasting, according to some aspects of the present disclosure. The system 1500 may be deployed on one or more computing devices, such as a cloud computing system or computing cluster containing any number of nodes. The components depicted in the example system 1500 may be hosted together, separately, or any combination thereof. For instance, the feature selection subsystem 1530 and the model selection subsystem 1540 may be communicatively coupled software components executed on disparate computer systems.

In system 1500, information about target variable 1502 is received from user input device 1510. User input device 1510 may include a graphical user interface (GUI) than can be used for identification of the target variable 1502 as well as for receiving input about various aspects of the system 1500 including definitions of the input data 1512, model parameters, indications to execute forecasts, and so on.

The identified target variable 1502 as well as input data 1512 are received by the table generator 1520. Input data 1512 includes the data, or independent variables, that will be used to model the target variable (also known as a dependent variable because it depends on the independent variables) in the resulting model. The table generator 1520 includes components for generating a data structure, such as a table 1562 or mapping, suitable for processing by ML. An example of such a data structure is an analytical base table (ABT). An ABT is a data structure that relates the independent variables to the target variable 1502. For example, the table generator 1520 can receive the input data 1512 in the form of comma-separated value (CSV) files uploaded using the user input device 1510. An ABT or similar data structure can be generated based at least in part on the uploaded CSVs following a data hygiene regime including, for example, basic data cleaning filters.

In some examples, the CSV files may include input data 1512 such as utility data, weather data, solar power consumption and generation data, and so on. Following creation of a suitable data structure for the ABT or similar data structure in a database, the data from the CSV files can be incorporated into the data structure in the database using an extract-transform-load (ETL) procedure or other procedures. In parallel, diagnosis of instance inputs can be performed to generate the ABT or similar data structure.

The generated table 1562 or similar data structure is received by a feature selection subsystem 1530, which generates a set of input candidate variables 1522. For example, the feature selection subsystem 1530 may use either or both of a feature engineering component 1532 or a feature selection component 1534 to determine the input candidate variables 1522. In the feature engineering component 1532, input candidate variables 1522 can be derived from the input data 1512. For example, some derived input candidate variables 1522 may include polynomial combinations of the independent variables included in the input data 1512. Other combinations may be used such as other linear or non-linear combinations of the independent variables.

The feature selection component 1534 may include components for feature selection for identification of the most important variables to include in the constructed ML model based on their contribution to the ML model's predictive power. In some examples, the feature selection component 1534 may include a random forest classifier 1536. The random forest classifier 1536 can be configured to receive a set of input candidate variables 1522, assign a score to each input candidate variable 1522 indicating its contribution or importance to predicting the target variable 1502, and output the assigned scores. The feature selection component 1534 can then select a subset of the input candidate variables 1538 with scores exceeding a predefined threshold for subsequent use in constructing a ML model.

Additionally or alternatively, other types of ML models alone or in combination with random forest classifier 1536 can also be used for similar purposes. Examples of such other types of ML models can include support vector machines, gradient boosting machines, k-nearest neighbors, multiple decision trees, various kinds of neural networks, logistic regressions, naive bayes analysis, and so on. Operation of the feature selection component 1534 may be performed using a generalized linear model (GLM) selection procedure that can identify the most important variables to include in the final ML model based on their contribution to the ML model's predictive power. In some examples, the GLM can use a stepwise approach to model selection.

The candidate variables subset 1538 is received by model selection subsystem 1540. Model selection subsystem 1540 includes components for model design 1542 and model training 1544. The model design component 1542 can construct one or more ML models using a combination of ML model components, which may be selected and configured automatically or according to selections made by the user. For example, a variety of ML model components may be available for stacking or otherwise combining. The ML components may include input layers, reshaping layers, CNN layers, LSTM layers, fully-connected layers, output layers, and others, or any combination thereof.

The model training component 1544 can use historical data to train each of the one or more ML models constructed by the model design component 1542. Some or all of the input data 1512 may be used for training the ML models. For example, a portion of the historical input data 1512 can be designated for training and another portion can be designated for evaluation to prevent overfitting of the ML models.

The models designed and trained by model selection subsystem 1540 are received by model evaluation subsystem 1550 that includes components for model evaluation 1552 and champion model selection 1554. One or more ML models are generated by the model selection subsystem 1540 so that their accuracy and other metrics can be empirically compared for selection of a "champion" ML model. The champion ML model is the best-performing ML model among the generated ML models according to certain predefined criteria.

The model evaluation component 1552 provides metrics for evaluation of the one or more generated ML models. For example, error statistics for a holdout period defined with respect to the input data 1512 can be used to evaluate the constructed ML model. Other metrics may also be used for comparison of the ML models and selection of the champion ML model, such as mean squared error, accuracy, precision, or recall.

The champion model selection component 1554 can be used for determining which among the one or more constructed ML models is the champion ML model that will be used for forecasting. In some examples, selection of the champion ML model is performed manually by the user. In other examples, selection of the champion ML model is performed automatically according to certain predefined criteria or algorithms.

For example, after training the ML model, the model evaluation component 1552 can compute an accuracy metric for the ML model using a set of validation data. For instance, a portion of the input data 1512 can be identified as "holdout data" for this purpose. The model evaluation component 1552 can likewise determine an accuracy metric for a forecasting model that is different from the constructed ML model. The champion model selection 1554 can compare the two accuracy metrics and select the ML model for use in generating the forecast based on the comparison.

The selected model 1556 may include any number of suitable ML models, including one. In some examples, the selected model 1556 may be a combination model in which the output of a CNN 1557 feeds directly into an LSTM 1558. Additionally or alternatively, other types of ML models may be used, including recurrent neural networks (RNNs), generative adversarial networks (GANs), multilayer perceptrons (MLPs), attention networks, transformer models, support vector machines (SVMs), gradient boosting machines (GBMs), stochastic gradient descent (SGD) classifiers, gaussian processes, Bayesian networks, conditional random fields (CRFs), graph neural networks (GNNs), variational autoencoders (VAEs), and others.

CNNs can include feature extraction components that that progressively extract features of increasing complexity. CNNs are commonly used to analyze images, but some examples described herein may apply CNNs in unconventional ways to process non-image data (e.g., time series data, numerical data, etc.). In the context of non-image data, the early layers of a CNN can identify simple patterns or characteristics that are present in the data. These features can combine to form more abstract and higher-level representations. For instance, in power generation data, early layers might detect basic trends, while deeper layers could capture more intricate temporal patterns or correlations with other factors like weather conditions. This may make a CNN 1557 unexpectedly adept for forecasting an energy-related target variable based on non-image input data.

In addition, even though some time series data included in the input data 1512 may not be inherently spatial, the concept of "locality" in CNNs can still be applied. Patterns occurring close together in time might be treated similarly to spatially proximate features in images. For instance, a CNN 1557 could identify repeating patterns that align with specific days or weeks. Additionally, CNNs can include edge detection features that can detect edges and boundaries in images. In the context of time series data, this may enable recognizing sudden changes or transitions in the data. For example, in power generation data, the abrupt shifts around 8 am and 5 pm could be detected by a CNN 1557.

LSTMs may also provide unique advantages for forecasting a target variable over other types of ML models. For example, in the context of power generation, forecasts can be highly dependent on weather conditions, such as solar irradiance, temperature, humidity, and wind speed, all of which can vary significantly over time. LSTM networks are capable of learning and modeling these temporal patterns by incorporating historical weather and power generation data into the LSTM model. LSTM networks can capture both short-term and long-term dependencies in the data, which can be useful for accurately predicting, for instance, power generation over time. Some LSTMs can include a gating mechanism for learning dependencies over time and to mitigate the vanishing gradient problem. The "memory cells" in the LSTM architecture allow the network to selectively store and retrieve relevant information from the past, while the gating mechanism controls the flow of information through the network.

In some examples, the generated model 1556 can be a hybrid model that includes at least CNN 1557 and LSTM 1558, which allows the model 1556 to capture both spatial and temporal features. For example, the CNN can be configured to identify spatial patterns associated with the target variable and the LSTM can be configured to identify temporal patterns associated with the target variable. In that case, the ML model 1556 can be configured to determine both the spatial patterns and the temporal patterns associated with the target variable.

The selected model 1556 is received by the forecasting subsystem 1560 and is used to make forecasts of the target variable over various selected future time periods, spanning short-term periods on the order of seconds or minutes to long-term periods on the order of years or more. For example, the forecasting model can be used to forecast energy consumption and production values for sources such as wind, gas, and solar power, electricity prices, components of load (e.g., electric vehicle charging demand), demand-side management, and so on. Accurate forecasts such as these can allow utilities to optimize dispatch based on forecasts of load beyond expected generation. The techniques described herein can additionally or alternatively be used for forecasting of other target variables, such as variables found in economic systems, ecological systems, computer networks climates, urban infrastructures, among many others.

Figure 16:
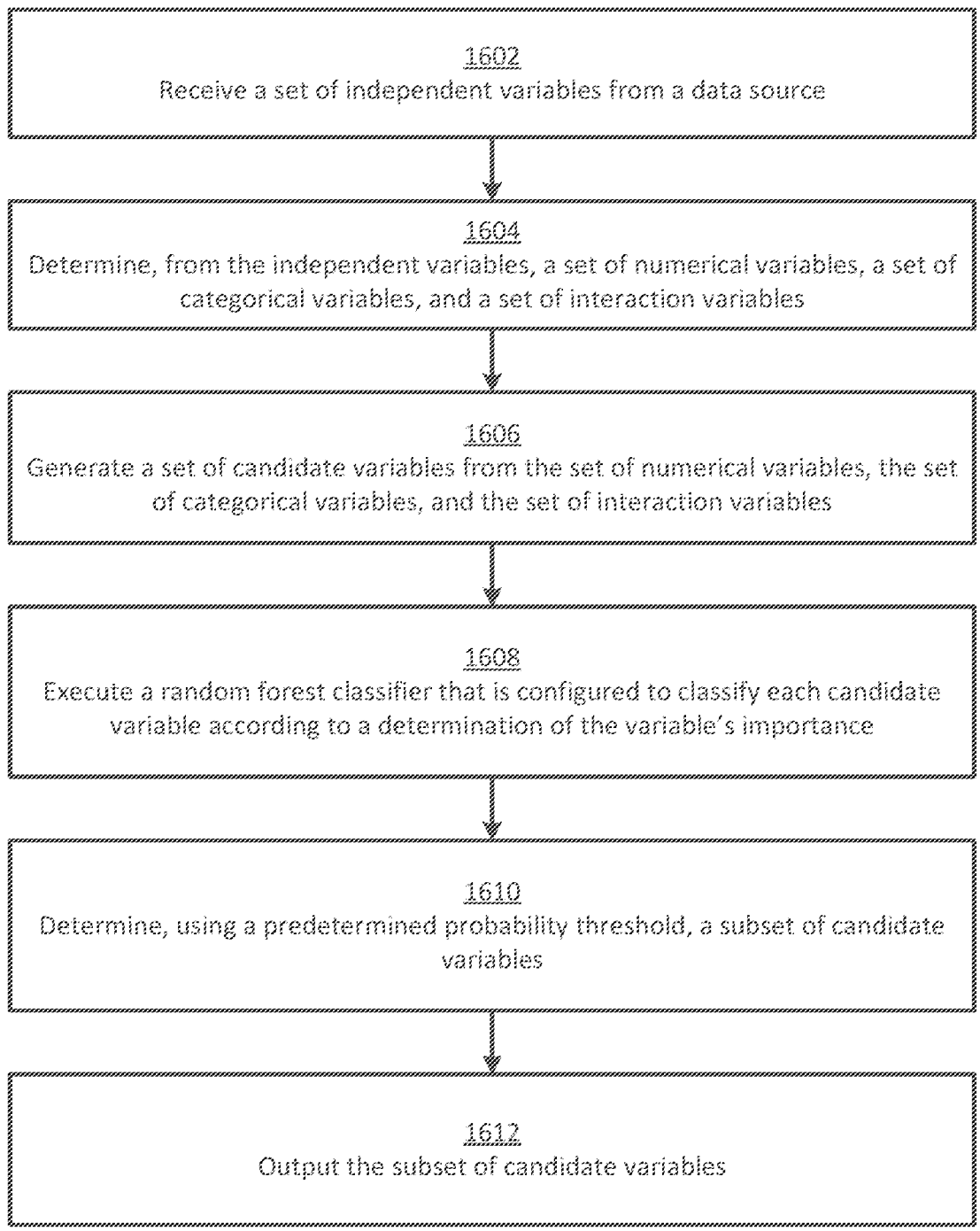
FIG. 16 shows a flowchart of an example of a process for performing feature engineering and selection, according to some aspects of the present disclosure.

Turning now to FIG. 16, FIG. 16 shows a flowchart of an example of a process for performing feature engineering and selection according to some aspects of the present disclosure. The feature engineering and selection may be performed by feature selection subsystem 1530 as described in FIG. 15. Other examples may involve more operations, fewer operations, different operations, or a different order of operations than is shown in FIG. 16.

At block 1602, a computer system receives a set of independent variables from a data source. For example, input data 1512 along with target variable 1502 can be used to populate an analytical base table (ABT) or other comparable data structure suitable for processing and analysis by a random forest classifier. The independent variables may be received from other data sources such as conventional database tables, CSV files, machine-readable structured data, and so on.

At block 1604, the computer system determines, from the independent variables, a set of numerical variables, a set of categorical variables, and a set of interaction variables. Numerical variables include variables that have quantifiable values and can be measured. Categorical variables include variables typically representing types or categories that can take one value out of a limited set of values, such as compass directions or colors. Example numeric variables include quantity, angle, pressure level, temperature, and luminosity. Example categorical variables include month, weekday, or hour.

Interaction variables include linear and non-linear combinations of numerical and categorical variables. Example interaction variables include month•hour, month•irradiance$^n$ where n expresses a polynomial order of 1, 2, 3, or more, month·hour•irradiance$^m$ where m expresses a polynomial order of 1, 2, 3, or more. The use of polynomial orders of irradiance can be used to capture the impact of, for example, solar radiation.

For instance, numerical variables can be combined through multiplication. Categorical variables can be combined by constructing a generalized linear model (GLM) that involves featurization of the categorical variables. In some examples, featurization of the categorical variables can include construction of a design matrix for use in the ML models. Elements of the constructed design matrix can represent combinations of the categorical variables as well as combinations of the categorical and numerical variables.

At block 1606, the computer system generates a set of candidate variables from the set of numerical variables, the set of categorical variables, and the set of interaction variables. For example, the numerical variables, categorical variables, and the engineered interaction variables can be combined into a single set of candidate variables. In one example implementation, about 900 candidate variables may be determined using this process, but the number can vary widely depending on factors such as the particular application, availability of input data, the nature of the input data, and so forth.

At block 1608, the computer system executes a random forest classifier that is configured to classify each candidate variable according to a determination of the variable's importance. An example of a random forest classifier 1536 is described in FIG. 15 above. The random forest classifier may be configured to generate scores for the set of candidate variables, in which each independent variable in the set of candidate variables is assigned a respective numerical score indicating its level of influence on the target variable. The random forest classifier or another component can then identify the subset of candidate variables, from the set of candidate variables, by comparing the scores to a threshold.

For example, the random forest classifier may include a plurality of decision trees, each of which is configured to classify a random subset of the candidate variables at each split. In some implementations, the importance of a variable can be measured by the decrease in heterogeneity for each candidate variable in one or more decision trees constituting the random forest classifier, which can be quantified using a metric such as the Gini impurity or entropy. The random forest classifier can then aggregate the importance scores from all the constituent decision trees to determine the overall importance scores for the variables. The aggregated importance scores can be ranked and variables with higher scores may be considered to have more influence on the target variable. For instance, given the ranking produced by the random forest classifier, some examples may identify a predetermined number of top-ranked variables (e.g., the top 10 ranked variables). Some other examples may identify a predetermined percentage of top-ranked variables (e.g., the top 5% of ranked variables).

Additionally or alternatively to the random forest classifier, other types of ML models can be used for selection of the subset of candidate variables. For instance, for smaller input datasets, XGBoost may perform classification faster due to the potential for parallelization. Likewise, for larger datasets or more complex relationships and interactions between features, gradient boosting decision trees may be a suitable choice for the classification task described herein. Various examples of factors to consider when selecting an ML model for the classification step of block 1608 include: a capability for capturing non-linear relationships and interactions between independent variables; robustness in the face of noisy data and outlier handling; ability to handle both numerical and categorical variables; minimized likelihood of overfitting; generalizability; and interpretable scoring.

At block 1610, the computer system determines, using a predetermined probability threshold, a subset of candidate variables. For example, feature selection may be performed using a GLM selection procedure that can identify the most important variables to include in the final ML model based on their contribution to the ML model's predictive power. In some examples, the GLM can use a stepwise approach to model selection. In the stepwise approach, the feature selection may start with an initial model and iteratively add or remove variables based on statistical significance, until a final subset of candidate variables is identified.

A predetermined probability threshold can be used to determine whether each candidate variable has sufficient importance with respect to its ability to predict the target variable. For example, if a probability threshold of 0.05 is used as the threshold significance level for variable inclusion or exclusion, a subset of about 300 candidate variables may be identified for use in training the ML model given a starting set of candidate variables with 900 members.

At block 1612, the computer system outputs the subset of candidate variables. For example, the subset of candidate variables may be sent to a component such as the model selection subsystem 1540 as described in FIG. 15.

Figure 17:
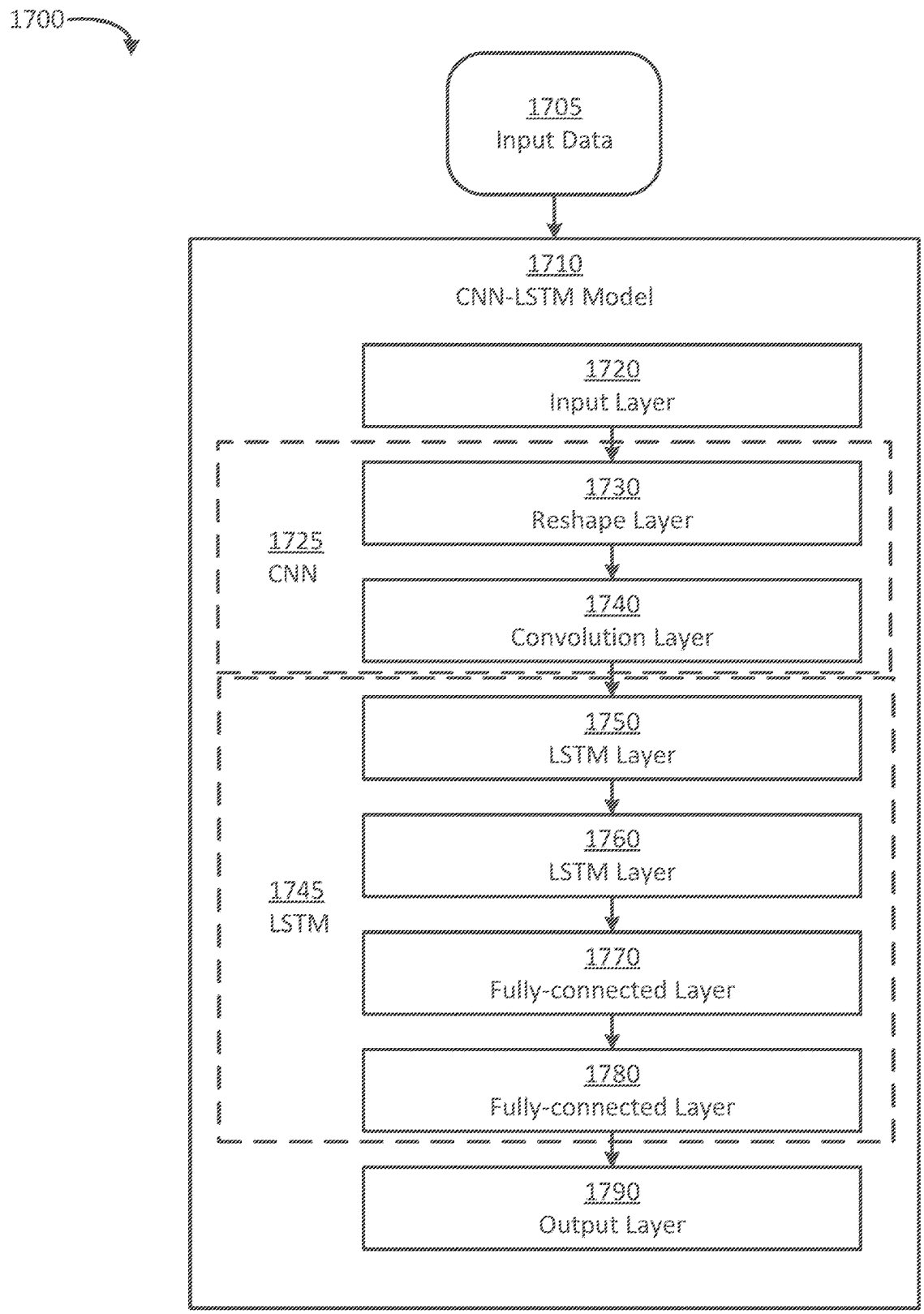
FIG. 17 shows an example of a constructed forecasting machine-learning model, according to some aspects of the present disclosure.

Turning now to FIG. 17, FIG. 17 shows an example of a constructed forecasting model 1700 according to some aspects of the present disclosure. The forecasting model 1700 may be constructed and trained by model selection subsystem 1540 and model evaluation subsystem 1550 of FIG. 15. Example model 1700 is an combination model including components of a CNN 1725 and an LSTM 1745, however other model types and configurations are possible. In this example, the combination model is a CNN-LSTM model with a single, integrated architecture in which the output of the CNN 1725 directly feeds into the LSTM 1745.

Model 1700 receives input data 1705 including the selected subset of candidate variables described above. The input data 1705 can be processed to exclude other independent variables that do not belong to the selected subset of candidate variables. The input data 1705 is received by an input layer 1720. The input layer 1720 can perform initial steps related to forward propagation through the subsequent layers including operations such as weighting, adding bias, passage through an activation function, and so on.

Model 1700 includes CNN 1725 that includes a reshape layer 1730 coupled to the input layer 1720. The reshape layer 1730 may include components for reshaping the candidate variables 1705 to a format required for processing by subsequent layers. For example, the dimensions or the structure of the input data may be altered without changing underlying values.

CNN 1725 includes a convolution layer 1740 coupled to the reshape layer 1730. The convolution layer 1740 can use filters or kernels to extract features from the candidate variables. In some examples, for instance, the filters or kernels slide over the reshaped candidate variables 1705, performing element-wise multiplications with the parts of the data they cover, and then sum up the results into feature maps. The convolution process can capture spatial patterns or time-dependent patterns in sequence data. A typical convolution layer 1740 implementation may be configured with 3 filters of width 3 and height 3 and the leaky Rectified Linear Unit (ReLU) activation function, however other configurations are possible.

Model 1700 includes an LSTM 1745 that includes a first LSTM layer 1750 coupled to CNN 1725 via convolution layer 1740. Likewise, LSTM 1745 includes a second LSTM layer 1760 coupled to the first LSTM layer 1750. The LSTM layers 1750, 1760 can process the candidate variables 1705 to capture long-term dependencies. The LSTM layers 1750, 1760 may include a series of gates that can allow the LSTM neural network to be trained to determine which data to store, update, or forget as it sequences through the input data. A typical LSTM layer 1750, 1760 may have 64 units, however other configurations are possible.

LSTM 1745 includes a first fully connected layer 1770 coupled to the second LSTM layer 1760. Likewise, LSTM 1745 includes a second fully connected layer 1780 coupled to the first fully connected layer 1770. The fully connected layers 1770, 1780 can combine the outputs of the LSTM layers 1750, 1760 with a set of weights and apply an activation function. A typical fully connected layer 1770 and 1780 sequence may be configured with 32 and 10 neurons, respectively, and may use the ReLU activation function, however other configurations are possible.

Model 1700 includes an output layer 1790 coupled to the LSTM 1745 via second fully connected layer 1780. The output layer 1790 can receive the output of the activation function of fully connected layers 1770, 1780 to produce an output vector representing a forecast over a future time window. The output vector may be converted or decoded, for example to a human-understandable format.

FIG. 18 depicts an example of a graphical user interface (GUI) 1800 for allowing a user to specify a target variable to be forecasted over a future time window, as described above in block 1402 with respect to FIG. 14. In this example, the GUI 1800 includes GUI 1800 includes a mode selector control 1805 that can be used to provide an indication of the configuration mode. For instance, the example mode selector control 1805 includes modes for configuring forecasting model properties and configurations. Properties may include descriptive details and high-level configuration details such as the name of the model, a description, the type of forecast, and so on. Configurations may include technical specifications of the desired forecasting model such as the target variable, definitions of the training data, error metrics to use, and so forth. In this example, the configuration mode is selected.

The GUI 1800 includes an options selector control 1810 for providing an indication of a particular set of configurations to adjust. Within the configuration mode are four options selectable using the options selector control 1810. The four options include a "main" option for defining the training and evaluation datasets, the target variable, and units in use, among others. The four options also include an "error metric" option for defining the error metrics to be used in ML model evaluation such as Mean Absolute Error (MAE) or Mean Absolute Percentage Error (MAPE). The four options also include an "advanced option" for defining low-level ML model details such as the highest polynomial order to include when generating interaction variables, specific interaction variables to use, additional categorial variables, and so on. The four options also include a "training parameters" option for specifying details about the generated ML model. The "training parameters" options will be described in detail in FIG. 19 below.

The GUI 1800 includes a training start date selector control 1815 for providing an indication of the lower boundary of the subset of available training data to use for training the constructed ML forecasting model. For example, a training dataset may include historical energy generation data from some point in the past to the present. Selection of the start data using control 1815 can indicate that the training component, such as the model training 1544 component described in FIG. 15, should use the portion of the historical dataset beginning at the selected start date through the present.

The GUI 1800 also includes holdout start date selector control 1820 and holdout end date selector control 1825. These controls can be used to provide an indication of a subset of the training data selected using control 1815 to withhold from training and instead to use for evaluating the constructed ML forecasting model, as described with respect to the model evaluation subsystem 1550 in FIG. 15 above.

The GUI 1800 includes a forecast interval selector control 1830. The constructed ML forecasting model can be used to make forecasts over future periods and intervals of arbitrary duration. For instance, in the example shown, a forecast interval of 60 minutes is selected. This selection may configure the constructed ML forecasting model to generate a forecast having forecasted values every 60 minutes (e.g., a 60 minute interval between datapoints in the forecast). Any number of intervals can be selected using this control according to the particular constructed ML forecasting model, ranging from short intervals on the order of seconds through long intervals on the order of years. In some examples, the forecast interval selector control 1830 or another similar control can instead be used to provide an indication of the future period of time.

The GUI 1800 includes a control for selecting input type 1835 and a control for selecting measurement type 1840. Controls 1835 and 1840 may be used to, for example, provide an indication of the units or dimensions of the input data and corresponding independent variables. In the examples shown, the available input types and measurement types include selections for power and energy.

Figure 19:
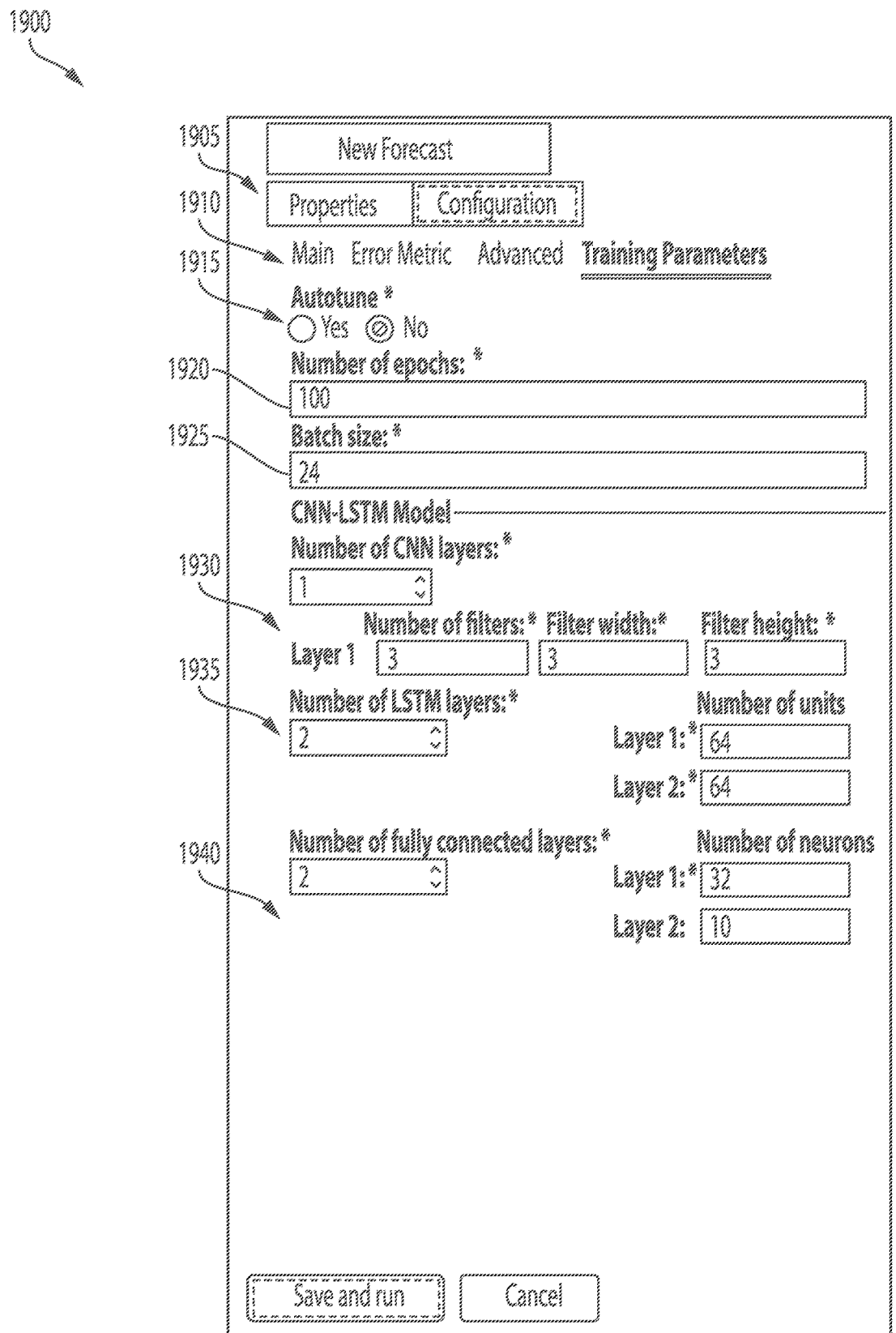
FIG. 19 depicts an example of a graphical user interface for allowing a user to specify certain parameters of a machine-learning model to be constructed, according to some aspects of the present disclosure.

Referring now to FIG. 19, FIG. 19 depicts an example of a graphical user interface (GUI) 1900 for allowing a user to specify certain parameters of a ML model to be constructed, as described above in block 1410 with respect to FIG. 14. Similar to GUI 1800, GUI 1900 includes a mode selector control 1905 a options selector control 1910. In this example, the "training parameters" option is selected using the options selector control 1910.

GUI 1900 includes an autotune selector control 1915 that can be used to provide an indication that the computer system operating, for example, system 1500 should automatically select the parameters of the constructed ML model according to predefined criteria or algorithms. For instance, the model selection subsystem 1540 as described in FIG. 15 may include components for automatically selecting optimized parameters for the constructed ML model based on the input data, target variables, candidate variables, and so on.

The GUI 1900 may include an epoch selector control 1920 and a batch size selector control 1925. These controls can be used for providing indications of the desired epoch count and batch size during training of the forecasting ML model. An epoch corresponds to a complete pass through the specified training dataset, such as a portion of the input data 1512, and the batch size corresponds to is the number of training samples used in one iteration of training before an update to the model's parameters is made.

The GUI 1900 includes CNN controls 1930. CNN controls include controls for adjusting CNN parameters (e.g., hyperparameters) used in the constructed ML forecasting model such as a control for specifying the number of CNN layers and, for each CNN layer, number of filters, filter width, and filter height. These filter parameters define the dimensions of the filter or kernel used to perform convolution operations as the filter processes the input data.

The GUI 1900 also includes LSTM controls 1935, including a control for specifying the number of LSTM layers and, for each LSTM layer, a control for specifying the number of units. Units may correspond to the number of hidden cells within the LSTM layer, which may define the dimensionality of the output space.

The GUI 1900 also includes fully connected layer controls 1940, including, a control for specifying the number of fully connected layers and, for each fully connected layer, a control for specifying the number of neurons. The number of neurons may correspond to the number of nodes in the neural network constituting the fully connected layer.

In one example, the GUI 1900 can be used to select a filter parameter for a convolutional layer of the ML model, a unit parameter for an LSTM layer of the ML model, and a neuron parameter for a fully connected layer of the ML model. Once the GUI 1900 has received selections for the filter parameter, the unit parameter, and the neuron parameter, the computer system can construct the ML model in accordance with the selections of the user.

In another example, the GUI 1900 includes options for selecting a first number of LSTM layers for the ML model and a second number of fully connected layers for the ML model. Based on these selections, the computer system can construct the ML model to have the first number of LSTM layers and the second number of fully connected layers. In this example, the number of CNN layers is fixed.

Referring now to FIG. 20, FIG. 20 depicts an example of a graphical forecast 2000 as may be generated for a target variable using input data not used during training, as described above in block 1416 with respect to FIG. 14. The output of the trained and evaluated ML model can be displayed using, among others, numerical, tabulated, or graphical presentations. In this example, a graphical presentation is selected using output mode control 2002.

Graphical forecast 2000 includes display controls 2005 that can be used to select, for example, subsets of the forecast for graphing. In this example, the display controls 2005 include controls for selecting the timespan of the displayed forecast, the geographical region or zone, and so on. Many other similar controls may be provided. For example, example graphical forecast 2000 includes additional display controls 2025 including examples such as a control for indicating whether or not to display the most recent data and a data source indicator.

Graphical forecast 2000 also includes a target variable selector control 2010 for selection of the target variable whose forecast is to be graphed. In this example, power generation is selected. Graphical forecast 2000 also includes a champion forecast indicator 2015 that indicates which ML model was selected as the champion model by the champion model selection 1554, as described in block 1412 with respect to FIG. 14.

The graph window 2020 displays the forecast in graphical form. In this example, two time series based on a power generation forecast from two ML models (LSTM prediction 2035 and CNN-LSTM prediction 2040) are plotted for a period of time and compared with the actual power generation 2020 during the same period. Graphical forecast 2000 includes a time period adjustment control 2045 for zooming in and out with respect to the time period depicted.

Referring now to FIG. 21, FIG. 21 depicts an example of a tabular forecast 2100 as may be generated for a target variable using input data not used during training, as described above in block 1416 with respect to FIG. 14. In this example, the tabular presentation is selected using output mode control 2102.

Tabular forecast 2100 includes display controls 2105 and additional display controls 2125, which can function similarly to controls 2005 and 2025 in the way described above with respect to FIG. 20. Tabular forecast 2100 also includes the target variable selector control 2110 and the champion forecast indicator 2115, similar to the corresponding controls 2010 and 2015 of FIG. 20.

Tabular forecast 2100 includes forecast table 2160 that displays substantially similar forecast information to the graphical forecast 2000 in tabular form. For example, forecast table 2160 can include a tabular representation of one or more time series forecasts (e.g., LSTM prediction 2135 and CNN-LSTM prediction 2140) alongside the actual power generation 2130 for the same times.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors to:
receive an input from a user indicating a target variable to be forecasted over a future time window, wherein the target variable relates to energy consumption or energy production;
determine a plurality of independent variables that influence the target variable, wherein the plurality of independent variables includes a plurality of temporal variables and a plurality of environmental variables;
generate a set of candidate variables for input to a random forest classifier, wherein the set of candidate variables includes the plurality of independent variables and additional variables, each of the additional variables being a new variable defined using a mathematical expression that includes at least two of the plurality of independent variables serving as operands in the mathematical expression;
execute the random forest classifier that is configured to identify, from the set of candidate variables, a subset of candidate variables having at least a threshold level of influence on the target variable, wherein the random forest classifier is configured to output the identified subset of candidate variables;

automatically construct an architecture of a machine-learning model based on a set of hyperparameter values and the identified subset of candidate variables, wherein the architecture of the machine-learning model is automatically constructed to receive the identified subset of candidate variables as inputs and generate a forecast of the target variable as an output, the architecture of the machine-learning model including at least:
- an input layer configured to receive the identified subset of candidate variables;
- a reshape layer coupled to the input layer;
- one or more convolution layers coupled to the reshape layer;
- one or more LSTM layers coupled to the one or more convolution layers;
- one or more fully connected layers coupled to the one or more LSTM layers; and
- an output layer coupled to the one or more fully connected layers;

after automatically constructing the machine-learning model, train the machine-learning model using historical data that indicates previous values of the target variable over a prior time window;

after training the machine-learning model, execute the machine-learning model to generate the forecast indicating future values for the target variable over the future time window; and transmit an output to the user indicating the forecast.

2. The system of claim 1, wherein the plurality of temporal variables include month, day, and hour; and
wherein the plurality of environmental variables include windspeed, azimuth angle of the sun, air quality, temperature, humidity, pressure, and irradiance.

3. The system of claim 1, wherein the additional variables include at least one additional variable defined as a polynomial of at least one of the plurality of independent variables.

4. The system of claim 1, wherein the random forest classifier is configured to:
generate scores for the set of candidate variables, each independent variable in the set of candidate variables being assigned a respective numerical score indicating its level of influence on the target variable; and
identify the subset of candidate variables, from the set of candidate variables, by comparing the scores to a threshold.

5. The system of claim 1, wherein the machine-learning model includes:
the input layer;
the reshape layer coupled to the input layer;
a convolution layer coupled to the reshape layer;
a first LSTM layer coupled to the convolution layer;
a second LSTM layer coupled to the first LSTM layer;
a first fully connected layer coupled to the second LSTM layer;
a second fully connected layer coupled to the first fully connected layer; and
the output layer coupled to the second fully connected layer.

6. The system of claim 1, wherein the one or more memories further comprises program code that is executable by the one or more processors to:
generate a graphical user interface for display to the user, the graphical user interface including options for selecting the hyperparameter values for the machine-learning model, wherein the hyperparameter values are values for hyperparameters including (i) a filter parameter for a convolution layer of the machine-learning model, (ii) a unit parameter for an LSTM layer of the machine-learning model, and (ii) a neuron parameter for a fully connected layer of the machine-learning model;
receive selections for the values of the filter parameter, the unit parameter, and the neuron parameter from the user via the graphical user interface; and
construct the machine-learning model in accordance with the values of the hyperparameters selected by the user.

7. The system of claim 1, wherein the one or more memories further comprises program code that is executable by the one or more processors to:
generate a graphical user interface for display to the user, wherein the graphical user interface includes options for selecting the hyperparameter values for the machine-learning model, wherein the hyperparameter values include (i) a first number of LSTM layers for the machine-learning model and (ii) a second number of fully connected layers for the machine-learning model;
receive selections for the first number of LSTM layers and the second number of fully connected layers from the user via the graphical user interface; and
construct the machine-learning model to have the first number of LSTM layers and the second number of fully connected layers selected by the user.

8. The system of claim 1, wherein the one or more memories further comprises program code that is executable by the one or more processors to:
after training the machine-learning model, compute a first accuracy metric for the machine-learning model using a set of validation data;
determine a second accuracy metric for a forecasting model that is different from the machine-learning model;
compare the first accuracy metric to the second accuracy metric; and
based on determining that the first accuracy metric is greater than the second accuracy metric, select the machine-learning model for use in generating the forecast.

9. The system of claim 1, wherein the plurality of independent variables includes numerical variables and categorical variables.

10. The system of claim 1, wherein the target variable is power output from a solar panel system.

11. The system of claim 10, wherein the plurality of independent variables influence the power output from the solar panel system, the random forest classifier is configured to identify the subset of candidate variables having at least the threshold level of influence on the power output from the solar panel system, the historical data indicates prior power output from the solar panel system over the prior time window, the machine-learning model is configured to generate a solar power forecast that predicts future power output from the solar panel system over the future time window, and the output to the user includes the solar power forecast.

12. The system of claim 11, wherein the plurality of independent variables include month, day, hour, and irradiance.

13. The system of claim 1, wherein the one or more convolution layers are configured to identify spatial patterns associated with the target variable, and wherein the one or more LSTM layers are configured to identify temporal patterns associated with the target variable, such that the machine-learning model is configured to determine both the spatial patterns and the temporal patterns associated with the target variable.

14. A method comprising:
receiving, by one or more processors, an input from a user indicating a target variable to be forecasted over a future time window, wherein the target variable relates to energy consumption or energy production;
determining, by the one or more processors, a plurality of independent variables that influence the target variable, wherein the plurality of independent variables includes a plurality of temporal variables and a plurality of environmental variables;
generate a set of candidate variables for input to a random forest classifier, wherein the set of candidate variables includes the plurality of independent variables and additional variables, each of the additional variables being a new variable defined using a mathematical expression that includes at least two of the plurality of independent variables serving as operands in the mathematical expression;
executing, by the one or more processors, the random forest classifier that is configured to identify, from the set of candidate variables, a subset of candidate variables having at least a threshold level of influence on the target variable, wherein the random forest classifier is configured to output the identified subset of candidate variables;
automatically construct an architecture of a machine-learning model based on a set of hyperparameter values and the identified subset of candidate variables, wherein the architecture of the machine-learning model is automatically constructed to receive the identified subset of candidate variables as inputs and generate a forecast of the target variable as an output, the architecture of the machine-learning model including at least: an input layer configured to receive the identified subset of candidate variables;
a reshape layer coupled to the input layer;
one or more convolution layers coupled to the reshape layer;
one or more LSTM layers coupled to the one or more convolution layers;
one or more fully connected layers coupled to the one or more LSTM layers; and
an output layer coupled to the one or more fully connected layers;
after automatically constructing the machine-learning model, training, by the one or more processors, the machine-learning model using historical data that indicates previous values of the target variable over a prior time window;
after training the machine-learning model, executing, by the one or more processors, the machine-learning model to generate the forecast indicating future values for the target variable over the future time window; and
transmitting, by the one or more processors, an output to the user indicating the forecast.

15. The method of claim 14, wherein the plurality of temporal variables include month, day, and hour; and
wherein the plurality of environmental variables include windspeed, azimuth angle of the sun, air quality, temperature, humidity, pressure, and irradiance.

16. The method of claim 14, wherein the additional variables include at least one additional variable defined as a polynomial of at least one of the plurality of independent variables.

17. The method of claim 14, wherein the random forest classifier is configured to:
generate scores for the set of candidate variables, each independent variable in the set of candidate variables being assigned a respective numerical score indicating its level of influence on the target variable; and
identify the subset of candidate variables, from the set of candidate variables, by comparing the scores to a threshold.

18. The method of claim 14, wherein the machine-learning model includes:
the input layer;
the reshape layer coupled to the input layer;
a convolution layer coupled to the reshape layer;
a first LSTM layer coupled to the convolution layer;
a second LSTM layer coupled to the first LSTM layer;
a first fully connected layer coupled to the second LSTM layer;
a second fully connected layer coupled to the first fully connected layer; and
the output layer coupled to the second fully connected layer.

19. The method of claim 14, further comprising:
generating a graphical user interface for display to the user, the graphical user interface including options for selecting the hyperparameter values for the machine-learning model, wherein the hyperparameter values are values for hyperparameters including (i) a filter parameter for a convolution layer of the machine-learning model, (ii) a unit parameter for an LSTM layer of the machine-learning model, and (ii) a neuron parameter for a fully connected layer of the machine-learning model;
receiving selections for the values of the filter parameter, the unit parameter, and the neuron parameter from the user via the graphical user interface; and
constructing the machine-learning model in accordance with the values of the hyperparameters selected by the user.

20. The method of claim 14, further comprising:
generating a graphical user interface for display to the user, wherein the graphical user interface includes options for selecting the hyperparameter values for the machine-learning model, wherein the hyperparameter values include (i) a first number of LSTM layers for the machine-learning model and (ii) a second number of fully connected layers for the machine-learning model;
receiving selections for the first number of LSTM layers and the second number of fully connected layers from the user via the graphical user interface; and
constructing the machine-learning model to have the first number of LSTM layers and the second number of fully connected layers selected by the user.

21. The method of claim 14, further comprising:
after training the machine-learning model, computing a first accuracy metric for the machine-learning model using a set of validation data;
determining a second accuracy metric for a forecasting model that is different from the machine-learning model;
comparing the first accuracy metric to the second accuracy metric; and
based on determining that the first accuracy metric is greater than the second accuracy metric, selecting the machine-learning model for use in generating the forecast.

22. The method of claim 14, wherein the plurality of independent variables includes numerical variables and categorical variables.

23. The method of claim 14, wherein the target variable is power output from a solar panel system.

24. The method of claim 23, wherein the plurality of independent variables influence the power output from the solar panel system, the random forest classifier is configured to identify the subset of candidate variables having at least the threshold level of influence on the power output from the solar panel system, the historical data indicates prior power output from the solar panel system over the prior time window, the machine-learning model is configured to generate a solar power forecast that predicts future power output from the solar panel system over the future time window, and the output to the user includes the solar power forecast.

25. The method of claim 24, wherein the plurality of independent variables include month, day, hour, and irradiance.

26. The method of claim 14, wherein the one or more convolution layers are configured to identify spatial patterns associated with the target variable, and wherein the one or more LSTM layers are configured to identify temporal patterns associated with the target variable, such that the machine-learning model is configured to determine both the spatial patterns and the temporal patterns associated with the target variable.

27. A non-transitory computer-readable medium comprising program code that is executable by one or more processors for causing the one or more processors to:
receive an input from a user indicating a target variable to be forecasted over a future time window, wherein the target variable relates to energy consumption or energy production;
determine a plurality of independent variables that influence the target variable, wherein the plurality of independent variables includes a plurality of temporal variables and a plurality of environmental variables;
generate a set of candidate variables for input to a random forest classifier, wherein the set of candidate variables includes the plurality of independent variables and additional variables, each of the additional variables being a new variable defined using a mathematical expression that includes at least two of the plurality of independent variables of the plurality of independent variables serving as operands in the mathematical expression;
execute the random forest classifier that is configured to identify, from the set of candidate variables, a subset of candidate variables having at least a threshold level of influence on the target variable, wherein the random forest classifier is configured to output the identified subset of candidate variables;
automatically construct an architecture of a machine-learning model based on a set of hyperparameter values and the identified subset of candidate variables, wherein the architecture of the machine-learning model is automatically constructed to receive the identified subset of candidate variables as inputs and generate a forecast of the target variable as an output, the architecture of the machine-learning model including at least: an input layer configured to receive the identified subset of candidate variables;
  a reshape layer coupled to the input layer;
  one or more convolution layers coupled to the reshape layer;
  one or more LSTM layers coupled to the one or more convolution layers;
  one or more fully connected layers coupled to the one or more LSTM layers; and
  an output layer coupled to the one or more fully connected layers;
after automatically constructing the machine-learning model, train the machine-learning model using historical data that indicates previous values of the target variable over a prior time window;
after training the machine-learning model, execute the machine-learning model to generate the forecast indicating future values for the target variable over the future time window; and
transmit an output to the user indicating the forecast.

28. The non-transitory computer-readable medium of claim 27, wherein the machine-learning model includes:
the input layer;
the reshape layer coupled to the input layer;
a convolution layer coupled to the reshape layer;
a first LSTM layer coupled to the convolution layer;
a second LSTM layer coupled to the first LSTM layer;
a first fully connected layer coupled to the second LSTM layer;
a second fully connected layer coupled to the first fully connected layer; and
the output layer coupled to the second fully connected layer.

29. The non-transitory computer-readable medium of claim 27, wherein the target variable is power output from a solar panel system and the plurality of independent variables influence the power output from the solar panel system, the random forest classifier is configured to identify the subset of candidate variables having at least the threshold level of influence on the power output from the solar panel system, the historical data indicates prior power output from the solar panel system over the prior time window, the machine-learning model is configured to generate a solar power forecast that predicts future power output from the solar panel system over the future time window, and the output to the user includes the solar power forecast.

30. The non-transitory computer-readable medium of claim 27, wherein the one or more convolution layers are configured to identify spatial patterns associated with the target variable, and wherein the one or more LSTM layers are configured to identify temporal patterns associated with the target variable, such that the machine-learning model is configured to determine both the spatial patterns and the temporal patterns associated with the target variable.

* * * * *